(12) United States Patent
Wu et al.

(10) Patent No.: US 10,320,431 B2
(45) Date of Patent: Jun. 11, 2019

(54) METHOD AND APPARATUS FOR INTERFERENCE CANCELLATION IN FULL-DUPLEX MULTI-CELL NETWORKS

(71) Applicant: Huawei Technologies Co., Ltd., Shenzhen (CN)

(72) Inventors: Huan Wu, Kanata (CA); Eddy Shi Ning Hum, Ottawa (CA); Wan Yi Shiu, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/661,541

(22) Filed: Jul. 27, 2017

(65) Prior Publication Data
US 2019/0036559 A1   Jan. 31, 2019

(51) Int. Cl.
  *H04L 27/02*  (2006.01)
  *H04B 1/10*  (2006.01)
  (Continued)

(52) U.S. Cl.
  CPC ......... *H04B 1/1027* (2013.01); *H04B 1/0475* (2013.01); *H04B 1/56* (2013.01);
  (Continued)

(58) Field of Classification Search
  CPC ........................... H04L 25/0212; H04L 5/0048
  (Continued)

(56) References Cited

U.S. PATENT DOCUMENTS 10,033,513 B2 * 7/2018 Wu ..................... H04L 5/0048
2002/0094782 A1   7/2002 Lin
  (Continued)

FOREIGN PATENT DOCUMENTS

CN      103974404 A    8/2014
CN      105391664 A    3/2016
WO   WO 2015196425 A1 * 12/2015 ............... H04B 1/10

OTHER PUBLICATIONS

B.M. Popovic et al.; Generalized Chirp-Like Sequences with Zero Correlation Zone; IEEE Trans. IT, vol. 56, No. 6; Jun. 2010; pp. 2957-2960.
(Continued)

*Primary Examiner* — Kevin M Burd
(74) *Attorney, Agent, or Firm* — BCF LLP

(57) ABSTRACT

Techniques and architectures for multi-stage cancellation of self-interference (SI) and joint cancellation of mutual-interference (MI) and residual SI in signals received by devices of a full-duplex multi-cell network are disclosed. In various examples, channel estimations and interference cancellation operations are performed utilizing multiple orthogonal training signals transmitted by network devices during a common over-the-air training period. Training signals derived from the orthogonal training signals during transmission are utilized to generate SI estimation information and perform at least a first SI cancellation operation on a received signal that includes at least first and second orthogonal training signals. The received signal and orthogonal training signals are then used to estimate a MI channel impulse response and a (residual) SI channel impulse response for use in joint MI/SI cancellation operations on further received signals. Details regarding the design of the orthogonal training signals and a unique system-level delay calibration procedure are also provided.

27 Claims, 12 Drawing Sheets

(51) Int. Cl.
*H04L 25/02* (2006.01)
*H04L 5/14* (2006.01)
*H04J 13/00* (2011.01)
*H04J 11/00* (2006.01)
*H04B 1/56* (2006.01)
*H04B 1/04* (2006.01)

(52) U.S. Cl.
CPC ....... *H04J 11/0023* (2013.01); *H04J 13/0062* (2013.01); *H04L 5/143* (2013.01); *H04L 25/0212* (2013.01); *H04L 25/0224* (2013.01); *H04L 25/0244* (2013.01); *H04B 2001/1045* (2013.01)

(58) Field of Classification Search
USPC .......................................................... 375/347
See application file for complete search history.

(56) References Cited

U.S. PATENT DOCUMENTS

| | | | | |
|---|---|---|---|---|
| 2009/0190634 A1* | 7/2009 | Bauch | ................... | H04B 7/2606 375/211 |
| 2009/0196370 A1* | 8/2009 | Cheng | ................... | H04L 1/0027 375/267 |
| 2015/0215149 A1* | 7/2015 | Mochizuki | .......... | H04L 27/2695 375/219 |
| 2016/0233903 A1 | 8/2016 | Wu et al. | | |
| 2016/0233904 A1 | 8/2016 | Wu et al. | | |
| 2016/0315754 A1 | 10/2016 | Wu et al. | | |
| 2017/0111155 A1* | 4/2017 | Liu | .......................... | H04B 1/10 |
| 2018/0205579 A1* | 7/2018 | Lee | ......................... | H04L 25/02 |

OTHER PUBLICATIONS

Bharadia, et al.; Full Duplex MIMO Radios; Proceedsing of NSDI '14; Apr. 2014; pp. 359-372.

D. C. Chu; Polyphase Codes with Good Periodic Correlation Properties; IEEE Trans. IT; Jul. 1972; pp. 531-532.

David Bladsjo, et al.; Synchronization Aspects in LTE Small Cells; IEEE Communications Magazine; Sep. 2013; pp. 70-77.

Goyal et al.; Full Duplex Operation for Small Cells; arXiv: 1412.8708v5 [cs.NI]; Sep. 30, 2015; 34 pgs; [http://arxiv.org/pdf/1412.8708v5.pdf].

Rahman, et al.; Multi-Cell Full-Duplex Wireless Communication for Dense Urban Deployment; 2016 IEEE Globecom; Dec. 4-8, 2016; 6 pgs.

* cited by examiner

METHOD AND APPARATUS FOR INTERFERENCE CANCELLATION IN FULL-DUPLEX MULTI-CELL NETWORKS

BACKGROUND

The advent and advancement of full-duplex (FD) technology in radio transceivers is expected to lead to full-duplex enabled multi-cell networks in Fifth Generation (5G) and beyond wireless communication systems. In a FD mode of operation, a device simultaneously transmits and receives using the same time and frequency resources, leading to a potential doubling of spectral efficiency as compared to half-duplex communications. In view of such potential benefits, and despite a number of design challenges, the capability of operating in a FD mode is considered an important enabling technology in next generation wireless communication devices and networks.

Interference mitigation is a particularly important consideration in the design of FD capable communication systems. For example, a communication device operating in a FD mode can experience relatively high levels of self-interference (SI), in addition to mutual-interference (MI) from other nearby FD-enabled devices.

SUMMARY

Figure 1:
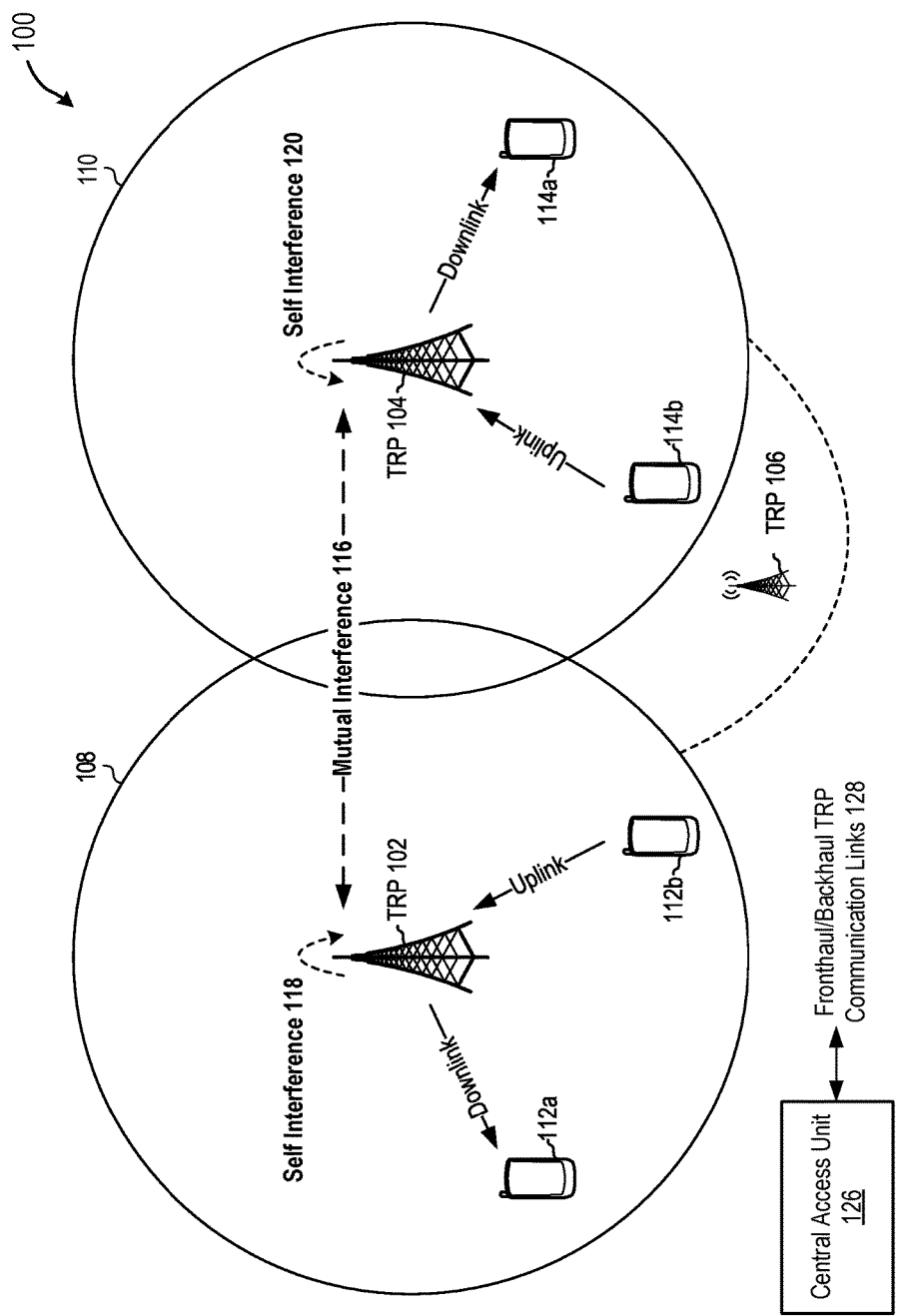
FIG. 1 illustrates an embodiment of a full-duplex enabled multi-cell network in accordance with the present disclosure.

The present disclosure describes flexible and scalable techniques and architectures for performing multi-stage self-interference (SI) cancellation and joint cancellation of mutual-interference (MI) and residual SI in a FD multi-cell network. Briefly, SI and MI channel estimations and interference cancellation operations are performed utilizing multiple orthogonal training signals transmitted by transmit/receive points (TRPs) during a shared over-the-air training period. Training signals derived from the orthogonal training signals during transmission are utilized to generate SI estimation information and perform partial SI cancellation operations on a received signal that includes at least first and second orthogonal training signals. The received signal and orthogonal training signals are then used to estimate a MI channel impulse response and a (residual) SI channel impulse response for use in joint MI/SI cancellation operations on further received signals. Details regarding the design of the orthogonal training signals and a unique system-level delay calibration procedure for generating timing and phase synchronization information used in SI and MI cancellation operations are also disclosed.

According to one aspect of the present disclosure, a method is provided for cancelling SI and MI in signals received by a full-duplex transmit/receive point (TRP). The method includes determining a first orthogonal training signal of a plurality of orthogonal training signals, mapping the first orthogonal training signal to a transmit antenna of the TRP, receiving (by a receive antenna of the TRP) a signal including the first orthogonal training signal and a second orthogonal training signal originating from a distinct TRP, performing a first SI cancellation operation on the received signal to generate first SI estimation information and cancel a first SI component of the received signal. The first SI cancellation operation utilizes a training signal derived from the first orthogonal training signal in conjunction with the transmission thereof. The method further includes estimating, based at least in part on the received signal and the first orthogonal training signal, a first channel impulse response (CIR) of a wireless channel between the transmit antenna and the receive antenna, the first CIR relating to a second SI component of the received signal, and estimating, based at least in part on the received signal and transmission information relating to the second orthogonal training signal, a second CIR of a wireless channel between the TRP and the distinct TRP.

In some embodiments of the method according to the above-described aspect of the present disclosure or any other aspects thereof, a number of optional operations and features are employed. One optional feature is the application of the SI estimation information and first and second CIRs in performing SI/MI cancellation operations on a received data signal. In this optional feature, the method further includes receiving, at the receive antenna of the TRP, a received data signal, and performing a SI cancellation operation on the received data signal utilizing the first SI estimation information. The optional feature further includes determining a residual SI component of the received data signal based on the first CIR and data transmitted by the transmit antenna of the TRP, determining a MI component of the received data signal based on the second CIR and data transmitted by the distinct TRP, and cancelling the residual SI component and the MI component of the received data signal.

Another optional feature is the method includes, prior to estimating the first CIR and the second CIR, performing a second SI cancellation operation on the received signal to generate second SI estimation information and cancel a second SI component of the received signal, the second SI cancellation operation utilizing a further training signal derived from the first orthogonal training signal.

Another optional feature includes performing a calibration procedure in which the method includes transmitting, via the transmit antenna, a first calibration training signal during a first calibration period, receiving, via the receive antenna, a second calibration training signal transmitted by the distinct TRP during a second calibration period, and estimating, based on the received second calibration training signal, a propagation delay value relating to the wireless channel between the TRP and the distinct TRP. The propagation delay value is used in another optional feature in estimating the first CIR and the second CIR. In other optional features, the plurality of orthogonal training signals comprises zero correlation zone (ZCZ) sequences or Zadoff-Chu sequences modulated with blocks of random phase rotations. According to the above-described aspect of the present invention, advantages of using these types of sequences include improved CIR estimation accuracy, as well as improved interference cancellation performance and the utilization of a shared training period for transmission of the orthogonal training signals.

According to another aspect of the present disclosure, an apparatus is provided for use in a full-duplex network, the apparatus comprising a transmitter operably coupled to a transmit antenna, the transmitter configured to transmit, via the transmit antenna, a first orthogonal training signal of a plurality of orthogonal training signals, a memory, processing circuitry operatively coupled to the memory, a receiver operatively coupled to a receive antenna and the processing circuitry, the receiver configured to receive, via the receive antenna, a received signal including the first orthogonal training signal and at least a second orthogonal training signal of the plurality of orthogonal training signals, the second orthogonal training signal originating from a distinct apparatus. The processing circuitry is configured to perform a first self interference (SI) cancellation operation on the received signal to generate first SI estimation information, and cancel a first SI component of the received signal utilizing a training signal derived from the first orthogonal training signal by the transmitter. The processing circuitry is further configured to estimate, based at least in part on the received signal and the first orthogonal training signal, a first channel impulse response (CIR) of a wireless channel between the transmit antenna and the receive antenna, the first CIR relating to a second SI component of the received signal, and estimate, based at least in part on the received signal and transmission information relating to the second orthogonal training signal, a second CIR of a wireless channel between the apparatus and the distinct apparatus.

In some embodiments of the apparatus according to this aspect of the present disclosure or any other aspects thereof, the processing circuitry is further configured to perform or utilize optional operations and features described in conjunction with the method of the aspect of the disclosure described above.

According to another aspect of the present disclosure, a method for cancelling self interference (SI) and mutual interference (MI) in signals received by a full-duplex transmit/receive point (TRP), the method comprising determining a plurality of orthogonal training signals including at least a first orthogonal training signal and a second orthogonal training signal, mapping the first orthogonal training signal to a transmit antenna (e.g., one of multiple transmit antennas) of a first TRP, mapping the second orthogonal training signal to a transmit antenna of a second TRP, communicating the first orthogonal training signal and the second orthogonal training signal to the first TRP and the second TRP, respectively, for concurrent transmission, receiving, from the first TRP, a received signal including a non-orthogonal training signal derived from the first orthogonal training signal, receiving, from the first TRP, a received signal including the first orthogonal training signal and the second orthogonal training signal as received by a receive antenna (e.g., one of multiple receive antennas) of the first TRP, and performing a first SI cancellation operation on the received signal. The first SI cancellation operation generates first SI estimation information, and utilizes the non-orthogonal training signal to cancel a first SI component of the received signal. The method further includes estimating, based at least in part on the received signal and the first orthogonal training signal, a first channel impulse response (CIR) of a wireless channel between the transmit antenna and the receive antenna of the first TRP, the first CIR relating to a second SI component of the received signal, and estimating, based at least in part on the received signal and the first orthogonal training signal, a second CIR of a wireless channel between the TRP and the second TRP.

Other aspects and features of the present disclosure will become apparent to those of ordinary skill in the art upon review of the following description of specific implementations of the disclosure in conjunction with the accompanying figures.

DETAILED DESCRIPTION

Wireless networks implemented in accordance with conventional Long Term Evolution (LTE) 4G with Time-Division Duplexing (LTE-TDD) and similar communications standards utilize a given frequency band for both downlink and uplink communications. The frequency band is shared by assigning alternating time slots to transmit and receive operations. Consequently, evolution of such standards to include full-duplex (FD) capabilities can lessen the impact of the temporal division and scheduling aspects of the air-interface (e.g., FD can improve latency and throughput) without greatly affecting the rest of the air-interface design. However, in a FD-capable apparatus such as a full-duplex capable transmit/receive point (TRP) operating in a wireless network, interference mitigation is a significant challenge.

For example, effective cancellation is needed for self-interference (SI) that includes the self-reception of signals transmitted by the TRP, because SI can be shown to be more than 100 dB stronger than the sensitivity level of the receiver of the TRP. Although progress has been made in the last few years in improving SI interference techniques, the impact of FD-enabled devices on a wireless network has been the subject of on-going study. Another issue that may be shown to be particularly detrimental to system gain is the effect of mutual-interference (MI) among FD-enabled TRPs when some or all of the TRPs are operating in a full-duplex mode. The novel architectures and methodologies described below provide for cascaded and joint cancellation of SI and MI within and between FD-enabled TRPs.

Referring now to FIG. 1, an embodiment of a full-duplex enabled multi-cell network 100 in accordance with the present disclosure is shown, including various types of interference. The illustrated embodiment includes TRP 102 and TRP 104 having respective coverage areas 108 and 110. Also illustrated are user equipment (UE) 112a and 112b, within coverage area 108, and UE 114a and 114b within coverage area 110. Transmit/receive points, including TRP 102 and TRP 104, can include, for example, mobile-relay stations, base stations, gNodeBs (sometimes called "gigabit" NodeBs), site controllers, microcells, picocells, or femtocells, which can be used in conjunction with remote radio heads (RRHs) in some implementations. A RRH can contain radio frequency circuitry plus analog-to-digital/digital-to-analog converters and up/down converters, and does not communicate independently of a TRP. Each UE 112a-114b represents any suitable end user device, and may also be referred to as a user wireless transmit/receive unit (WTRU), mobile station, fixed or mobile subscriber unit and may include a cellular telephone, personal digital assistant, smartphone, laptop or tablet, for example.

In the example network 100 of FIG. 1, the first TRP 102 and the second TRP 104 operate in FD mode, and the UE 112a, 112b, 114a and 114b operate in a legacy half-duplex mode. The network 100 can include one or more additional transmit/receive points (represented by third TRP 106) and UEs having associated interference, details of which are omitted in FIG. 1 for sake of clarity. An example of interference between FD-enabled TRPs is described below in conjunction with FIG. 2.

Using LTE-TDD as an example, inter-cell interference from TRP to TRP (TRP-TRP IF or mutual-interference) is largely avoided due to synchronization on a common UL-DL configuration. In contrast, in a FD-enabled network such as network 100 where TRPs operate in FD mode, this and other types of interference can be problematic. For example, mutual-interference (MI) 116 can be simultaneously observed in all neighboring TRPs when shared frequency resources are utilized. In particular, TRP 102 can experience MI 116 from TRP 104 while at the same time TRP 104 can experience MI 116 from TRP 102. Another type of interference in the network 100 of FIG. 1 is self-interference (SI) 118 and 120, which may be considered to arise from coupling and reflection of a transmitted signal back to a receiver of the transmitting TRP 102 or TRP 104. This type of interference tends to be the most dominant.

Interference observed at a full-duplex TRP 102-106 in network 100 can be (at least partially) cancelled as described herein. In particular, the focus of the disclosed techniques is on cancellation of SI 118/120 and MI 116.

The illustrated network 100 also includes a central access unit 126 and fronthaul/backhaul TRP communication links 128. In one arrangement, central access unit 126 can control all or a subset of TRPs 102-106 via the fronthaul/backhaul TRP communication links 128, which can include optical, wireless or other connections. It is understood herein that the capacity of the fronthaul/backhaul TRP communication links 128 is sufficient and the links are essentially lossless for data transfer. Further, although central access unit 126 is shown as separate from TRPs 102-106, in some embodiments it could alternatively be co-located with one or more TRPs. Also, though not shown, the TRPs 102-106 could communicate directly with each other (e.g., through an Xn interface). Embodiments and options for centralized and de-centralized control and coordination of interference cancellation procedures in accordance with the present disclosure are described more fully below in conjunction with FIG. 4 and FIG. 5.

Although the present disclosure describes example embodiments in the context improvements to existing standards, aspects of the disclosure may be applied to other standards compliant communication systems, as well as non-standards compliant communications systems supporting full-duplex operations.

Figure 2:
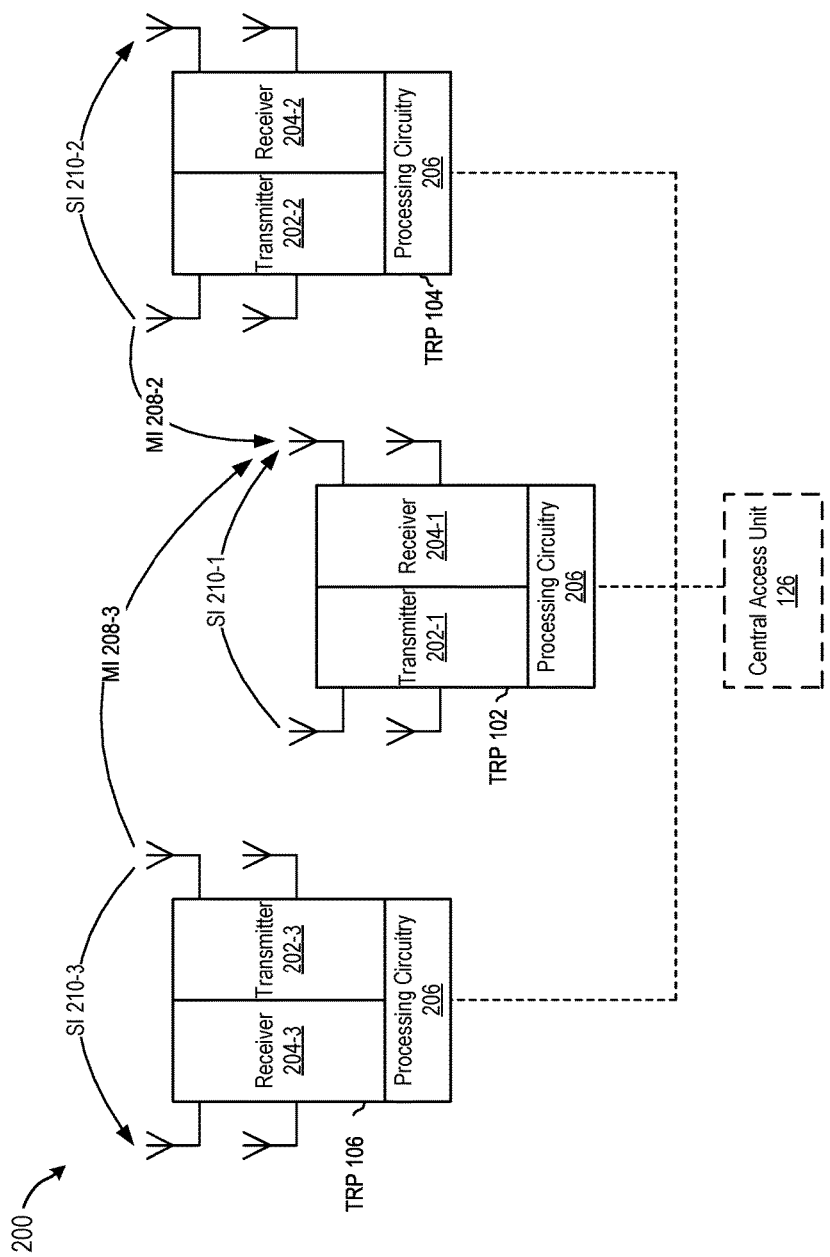
FIG. 2 illustrates an embodiment of a full-duplex network including a plurality of transmit/receive points in accordance with the present disclosure.

FIG. 2 illustrates an embodiment of a FD network 200 including a plurality of transmit/receive points in accordance with the present disclosure. In addition to TRP 102, the FD network 200 generally includes Kb TRPs. However, only two additional TRPs, TRP 104 and TRP 106, are shown in the illustrated embodiment.

TRP 102 includes a first transmitter 202-1 and a first receiver 204-1. The second TRP 104 includes a second transmitter 202-2 and a second receiver 204-2, and the third TRP 106 includes a third transmitter 202-3 and a third receiver 204-3. Each of the TRPs 102-106 further includes processing circuitry 206. In the illustrated embodiment, the TRPs of the FD network 200 are controlled by a central access unit 126. In other embodiments, such as described in conjunction with FIG. 4, the TRPs of the FD network 200 are controlled by a Cloud-RAN (C-RAN).

In the illustrated FD network 200, the first TRP 102 experiences first SI 210-1 at receiver 204-1. Likewise, the second TRP 104 experiences second SI 210-2 at receiver 204-2, and the third TRP 106 experiences third SI 210-3 at receiver 204-3. The first TRP 102 is further shown experiencing MI 208-2 from the transmitter 202-2 of the second TRP 104, and MI 208-3 from the transmitter 202-3 of the third TRP 106.

As described more fully below in conjunction with the examples of FIGS. 3-12, novel architectures and methodologies are introduced for interference cancellation in a full-duplex multi-cell network. Briefly, the described cascaded and joint SI and MI cancellation operations utilize multiple orthogonal training signals, which share a common over-the-air (OTA) training period, as well as training signals derived from the orthogonal training signals transmitted by TRPs during the shared training period, to generate channel estimates (e.g., channel impulse responses (CIRs), MIMO channel estimates, and the like). Details regarding the design of the orthogonal training signals based on system requirements are also provided, as well as system-level delay calibration procedures.

Figure 3:
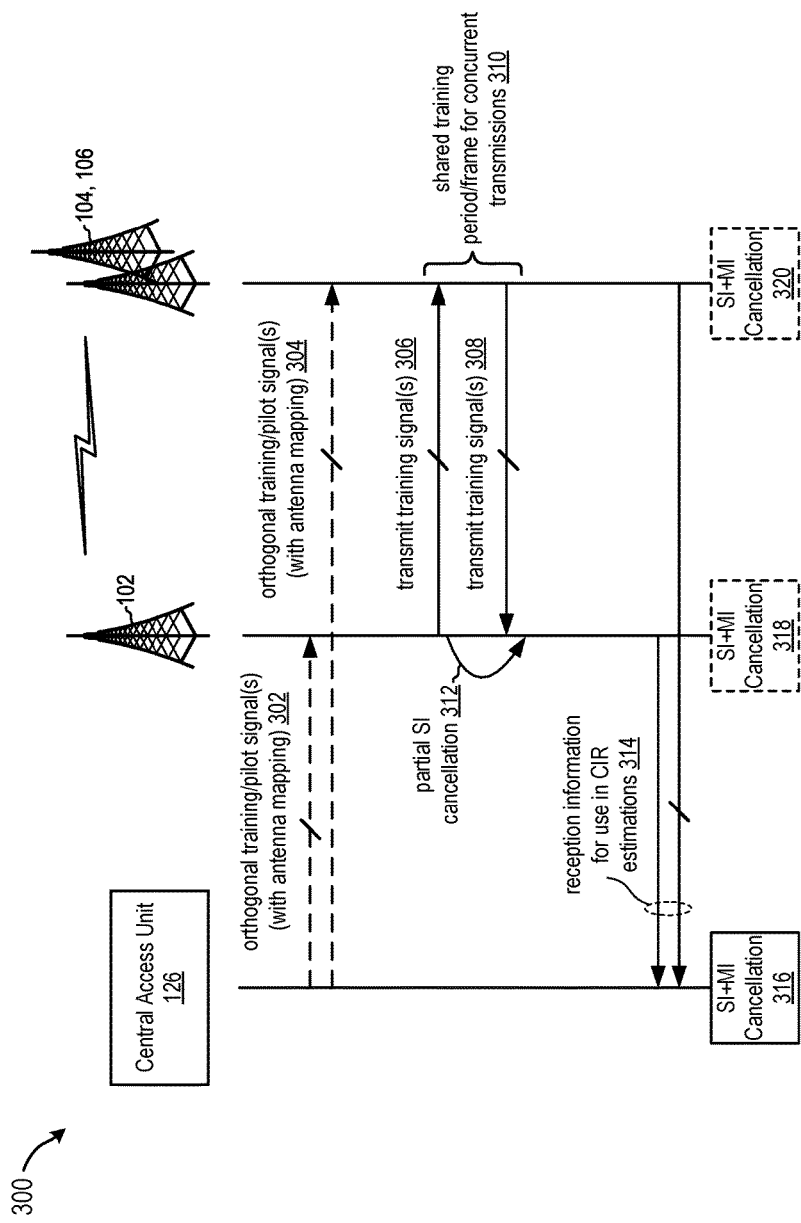
FIG. 3 illustrates concurrent transmissions of orthogonal training signals between transmit/receive points to generate channel estimation information in accordance with the present disclosure.
Figure 4:
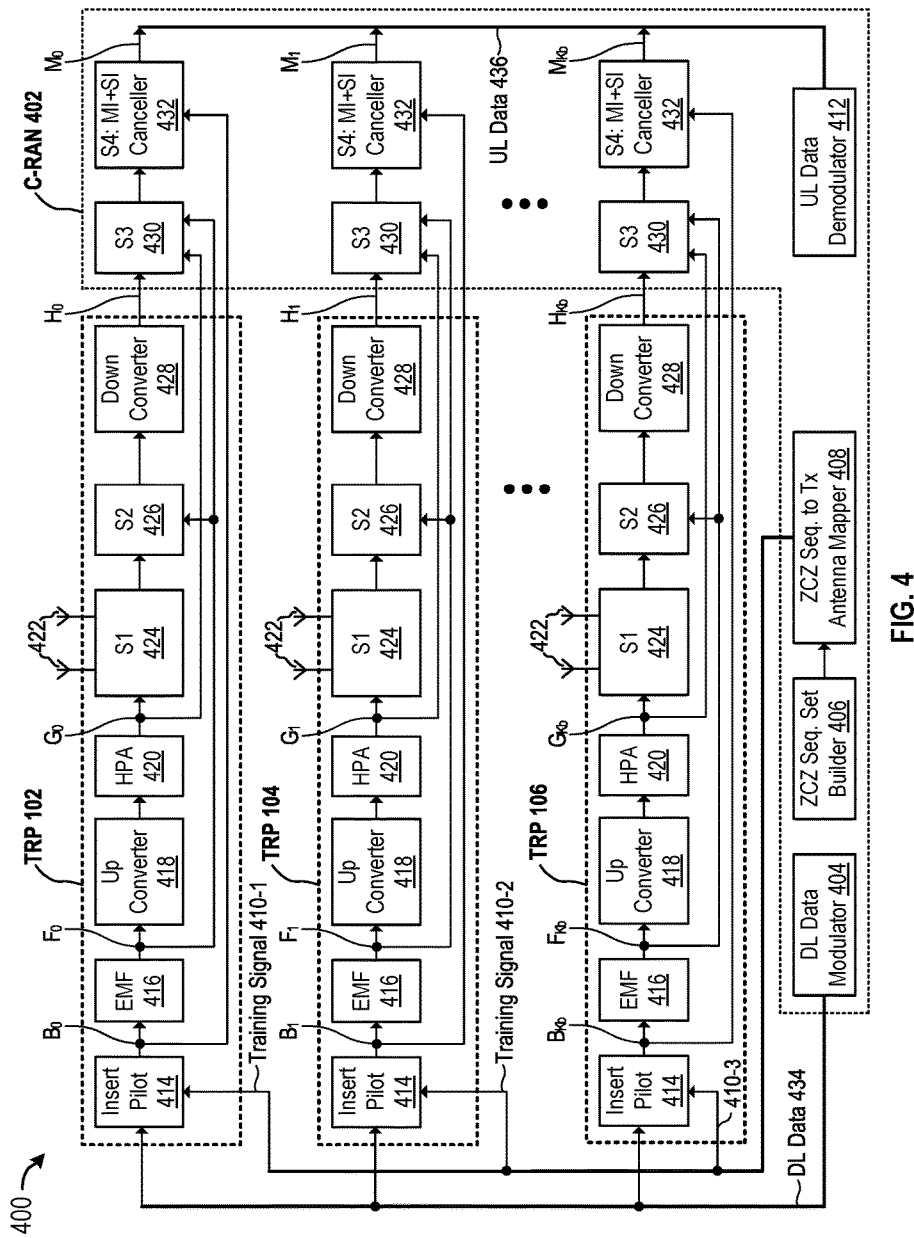
FIG. 4 is a schematic block diagram of an embodiment of full-duplex multi-cell network in accordance with the present disclosure.

FIG. 3 illustrates concurrent transmissions of orthogonal training signals between transmit/receive points to generate channel estimation information in accordance with the present disclosure. In the illustrated timing diagram 300, orthogonal training signals (which may also be referred to herein as training signals, orthogonal pilot signals and/or pilot signals) are determined by the central access unit 126 and communicated to neighboring TRPs 102-106 for concurrent transmission. In one example, at least a first orthogonal training signal is communicated at 302 (e.g., via a fronthaul link such as shown in FIG. 4) to TRP 102 and at least a second orthogonal training signal is communicated at 304 to a further TRP 104/106. Depending on the particular multi-cell network configuration, for example, each of TRP 104 and TRP 106 may receive one or more distinct orthogonal training signals for concurrent transmission. In one example, the orthogonal training signals are constructed from a general zero-correlation-zone (ZCZ) sequence, and include cyclic prefixes. Use of ZCZ sequences to generate training signals/sequences allows for improved channel impulse response (CIR) estimation accuracy, as well as improved interference cancellation performance. Selection and generation of appropriate orthogonal training signals in view of communications system requirements are described more fully below.

In some embodiments, the central access unit 126 may further communicate a mapping (not separately illustrated) of the orthogonal training signals to respective transmit antennas of the TRPs 102-106. According to other embodiments (such as the distributed embodiment of FIG. 5), one or both of the orthogonal training signals and associated transmitter antenna mappings are generated or otherwise determined by processing circuitry of the TRPs 102-106.

Concurrent transmission of the orthogonal training signals is advantageously scheduled during a shared training period/frame for concurrent transmissions (at 310), an example of which is described below in conjunction with FIG. 7. During the illustrated shared training period, the TRP 102 transmits (at 306) one or more orthogonal training signals for reception by TRPs 104/106. Likewise, TRPs 104/106 transmit (concurrently at 308) one or more orthogonal training signals for reception by TRP 102 and, as applicable, other neighboring TRPs.

Using TRP 102 as an example, a receiver antenna (e.g., one of a plurality of receiver antennas) receives a signal including the one or more orthogonal training signals transmitted by TRPs 104/106 during the shared training period. The received signal also includes an SI component resulting from an orthogonal training signal transmitted by a transmit antenna (e.g., one of a plurality of transmit antennas) of TRP 102 at 306. As detailed below, at least a first partial SI cancellation operation (which may also be considered an SI estimation operation because it generates first SI estimation information for use in SI operations on subsequently received data signals) is performed on the received signal. The partial SI cancellation operation utilizes a training signal derived from the orthogonal training signal in conjunction with transmission of the orthogonal training signal at 306. For example, the partial SI cancellation operation can utilize a filtered version of the orthogonal training signal from the transmission path of TRP 102 used to transmit the orthogonal training signal. Various such derived training signals are described in greater detail below with reference to FIGS. 4 and 5.

The received signal is then included in reception information that is provided (at 314) to the central access unit 126 for use in estimating CIRs for wireless channels between the receiver antenna (or multiple receiver antennas) of TRP 102 and the various transmit antennas used to transmit the orthogonal training signals. In the illustrated embodiment, similar reception information is provided to the central access unit 126 by TRPs 104/106.

Figure 5:
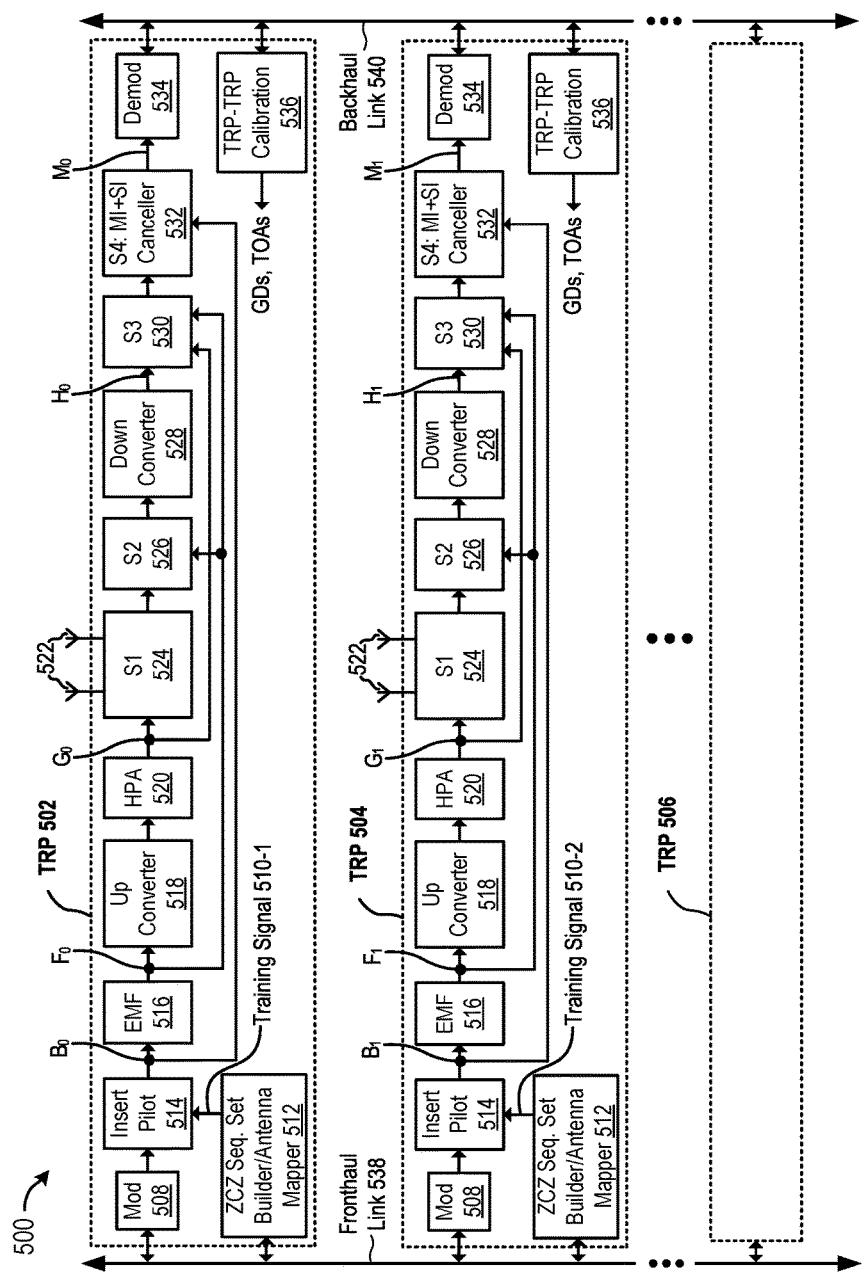
FIG. 5 is a schematic block diagram of another embodiment of a full-duplex multi-cell network in accordance with the present disclosure.

In one example, the central access unit 126 utilizes the estimated CIRs to perform joint SI and MI cancellation operations 316 on data signals received by TRPs 102-106. In an alternate example, such as illustrated by FIG. 5, generation of estimated CIRs and joint SI and MI cancellation operations 318/320 are performed in a distributed manner by TRPs 102-106.

SI channel estimation and cancellation techniques based on orthogonal training signals for complexity reduction and numerical stability improvement were described in U.S. Utility application Ser. No. 14/617,598, filed Feb. 9, 2015 and hereby incorporated herein by reference. Such techniques were extended for use in MI channel estimation and cancellation for FD multi-cell applications in U.S. Utility application Ser. No. 14/879,941, filed Oct. 9, 2015 and hereby incorporated herein by reference. In the present disclosure, novel improvements to and applications of such techniques are described.

Referring more specifically to FIG. 4, a schematic block diagram of an embodiment of full-duplex multi-cell network 400 in accordance with the present disclosure is shown. The illustrated network 400 includes TRP 102, TRP 104 and TRP 106 (collectively referred to herein as TRPs 102-106). A network implemented in accordance with this embodiment can include a different number of TRPs than is shown. In general, the TRPs 102-106 (e.g., remote radio units (RRUs)) receive orthogonal training signals 410 (or information sufficient to identify, retrieve, construct, or otherwise determine the orthogonal training signals 410), relevant downlink (DL) data 434 and control information from a C-RAN 402 or other centralized control node, and provide uplink (UL) data 436 to the C-RAN 402. The C-RAN 402 and TRPs 102-106 may communicate with each other, for example, utilizing the latest CPRI standard, Coarse or Dense Wavelength Division Multiplexing technology, and/or mmWave to enable transmission of control and baseband signals over a relatively long distance.

The C-RAN 402 of the disclosed embodiment includes a downlink data modulator 404 that provides DL data 434 to the TRPs 102-106 for transmission. The C-RAN 402 further includes an uplink data demodulator 412 for demodulating UL data 436 received from the TRPs 102-106. In this embodiment, a ZCZ sequence set builder 406 of the C-RAN 402 generates the orthogonal training signals 410-1-410-3 (collectively referred to as training signals 410) transmitted by the TRPs 102-106. The training signals 410 are individually mapped to respective transmit antennas of the TRPs 102-106 by ZCZ sequence to Tx antenna mapper 408. The resulting mapping information is communicated (e.g., tunneled) to the TRPs 102-106 in conjunction with the training signals 410. An insert pilot module 414 of each of the TRPs 102-106 receives the training signals 410, which can then be multiplexed with other DL data 434 for transmission. The training signals 410 are transmitted during a shared training period and in compliance with a standard air-interface, such as described in conjunction with FIG. 7.

Each of the illustrated TRPs 102-106 further include a low-pass/emission filter (EMF) 416, an upconverter 418, a high-power amplifier (HPA) 420, transmit/receive antennas 422 (including multiple transmit antennas and multiple receive antennas), and a downconverter 428. Each of these elements operates in a generally conventional manner to form the Tx and Rx chains of the TRPs 102-106 (other elements of which are not separately illustrated for sake of clarity), and also support the interference mitigation techniques described herein. The TRPs 102-106 may perform, for example, standard transceiver functionality. As also illustrated, multiple forms of training signals (also referred to herein as derived training signals) are generated at the output nodes (or test points) $F_k$ and $G_k$ of the Tx chains of the TRPs 102-106 during transmission of orthogonal training signals (which are present at test point $B_k$ during the transmission process).

As also illustrated, the TRPs 102-106 of this embodiment include cascaded SI estimation and cancellation stages, shown as a stage-1 canceller (S1 424) and a stage-2 canceller (S2 426), and the C-RAN 402 includes a stage-3 canceller (S3 430) and a stage-4 canceller (S4 432). As illustrated in the example of FIG. 5, other arrangements are possible, and one or both of S3 and S4 (or the like) could be included in a TRP in a decentralized approach. Although S1-S4 are generally referred to as cancellation stages or cancellation operations, channel estimation operations such as those described herein are also performed by S1-S4.

In general, the S1-S4 cancellers generate differing SI/MI channel estimations, based in part on (orthogonal and/or non-orthogonal) training signals, and perform SI/MI cancellation operations based on the channel estimations and relevant transmission information (e.g., known transmitted data symbols or information sufficient to effectively recreate such data symbols).

The orthogonal training signals are, primarily, the training signals for MI channel estimation at S4 432, and can also be used for residual SI channel estimation and cancellation at S4 432. The orthogonal training signals are considered to be wideband signals having a bandwidth that exceeds the normal downlink signal bandwidth (e.g., for a 20 MHz LTE signal, the bandwidth of the orthogonal training signals is approximately 30.72 MHz). A filtered version of the orthogonal training signal, such as an orthogonal training signal filtered by the EMF 416 (at test point $F_k$) in a TRP 102-106, can serve as a derived training signal for SI channel estimation for S2 426 and S3 430. The filtered training signal is, in general, a narrowband signal that is no longer orthogonal with respect to the wideband orthogonal training signals. The training signal tapped at test point $G_k$ is mainly utilized for SI channel initial estimation (tuning) and continuous tracking for S1 424, and can optionally be used at S3 430 as well. Note that training signal routing of FIGS. 4 and 5 are for illustrative purposes and necessary upconverters and downconverters, including digital-to-analog converters (DACs) and analog-to-digital converters (ADCs), may be required (but are not shown) to fulfill the functionality of a particular S1-S4 canceller.

The various interference cancellation stages of a receiver of the illustrated TRPs 102-106/C-RAN 402 have different objectives and different implementations, and as noted utilize differing forms of training signals. S1 424, for example, targets the strongest SI, which arises due to leakage and coupling between antennas of a TRP. S1 424 is implemented in the analog RF domain and operates before the frontend operations of a receiver, functioning to reduce the dynamic performance requirements of the receiver frontend. S1 424 may utilize different algorithms based on the nature of the training signal at the output of HPA 420, and typically requires a dedicated training period for tuning and tracking. Although the algorithms and implementations of S1 424 are generally beyond the scope of this disclosure, the disclosed architectures provide a framework, including a derived training signal and a shared training period for S1 424, to tune and track an SI channel.

S2 426 targets the relatively strong SI due to close-in signal reflections around antennas, and may be implemented in the analog domain or in mixed analog and digital domains to improve the dynamic range of ADCs used at various stages. S3 430 targets the SI due to residuals of previous stages and distant reflections, and can occur in the digital domain. In the illustrated network 400, a received signal that is operated on by S1 424 and S2 426 is provided to S3 430/C-RAN 402 at test point $H_k$. Both S2 426 and S3 430 may utilize a narrowband training signal (e.g., from test point $F_k$) in a Tx path to take advantage of complexity reduction due to a reduced canceller order. S3 430 may also utilize a derived training signal tapped at test point $G_k$ to achieve improved cancellation of HPA nonlinearities and noise floor. The disclosed architecture enables SI cancellation operations that are compatible, in both cascaded and joint manners, with the MI cancellation operations at S4 432.

The S4 432 canceller mainly targets the MI between TRPs in a full-duplex multi-cell (FD-MC) network, and is preferably implemented in the digital domain. Residual SI components of a received signal can be cancelled jointly with MI at S4 432 as described below. S4 432 can require orthogonal training signals due to the potential of a large number of transmit antennas to be addressed in a FD-MC network, and the least-square based channel estimation used in certain embodiments of S2 426 and S3 430 may not be tractable if non-orthogonal training signals are employed. The interference-mitigated signal at the output of S4 432 (test point $M_k$) is provided to uplink data demodulator 412 for further processing.

A C-RAN based FD-MC network can implement aspects of the present invention in a centralized manner because transmission information relating to received signals can be readily available at, for example, a central access unit CU, and interference cancellation can be performed digitally, for example, in centralized baseband circuitry. Aspects of the present application can be implemented at TRPs simultaneously for hybrid analog and digital interference cancellation in TRPs where the required transmission and channel information, or reconstructed copies of the interference, can be passed from the C-RAN to the TRPs with proper timing advances. One of the advantages of two-stage hybrid analog/digital and digital cancellation in TRPs and a C-RAN is that an improved dynamic range can be achieved for both the interference residual and uplink signal.

FIG. 5 is a schematic block diagram of another embodiment of a full-duplex multi-cell network 500 in accordance with the present disclosure. In this embodiment, certain of the operations and functionality occurring in the C-RAN 402 of FIG. 4 are instead performed in a distributed manner within TRP 502, TRP 504 and TRP 506 (collectively referred to herein as TRPs 502-506). A network implemented in accordance with this embodiment can include a different number of TRPs than is shown in FIG. 5.

In particular, the illustrated TRPs 502-506 include a downlink data modulator 508 for modulating data received from a fronthaul link 538, as well as an uplink data demodulator 534 for demodulating received data for provision to a backhaul link 540. The TRPs 502-506 further include a ZCZ sequence set builder and antenna mapper module 512, which operates to generate or otherwise determine training signals 510-1, 510-2, etc. (collectively referred to as training signals 510) and associated antenna mappings. In addition, each of the illustrated TRPs 502-506 include a TRP-TRP calibration module 536 that generates respective group delay (GD) and time-of-arrival (TOA) estimations for use as detailed below. The remaining elements of a TRP 502-506, including insert pilot module 514, EMF 516, upconverter 518, HPA 520, antennas 522, S1 524, S2 526, downconverter 528, S3 530 and S4 532 operate in like manner to the corresponding elements of FIG. 4. The interference-mitigated signal at the output of S4 532 (test point $M_k$) is provided to uplink data demodulator 534 for further processing.

In the network 500, orthogonal training signals 510 and/or transmission information relating to the transmission of orthogonal training signals 510 by distinct TRPs is shared between TRPs 502-506 for use in channel estimation and interference cancellation operations. Sharing of such information can be performed via fronthaul/backhaul link 538/540 or any other suitable communication link available to the TRPs 502-506, examples of which can include links in unlicensed spectrum (LTE-U), license assisted access (LAA) links, IEEE 802.11 links, etc.

A TRP 102-106 or TRP 502-506 can, in certain embodiments, save a received training signal (or multiple such signals) locally or remotely. For example, an orthogonal training signal 410/510 (or information sufficient to recreate or duplicate an orthogonal training signal 410/510) may be saved to a local memory, a remote memory, a local database, a remote database, a local server, a remoter server, or the like.

Figure 6:
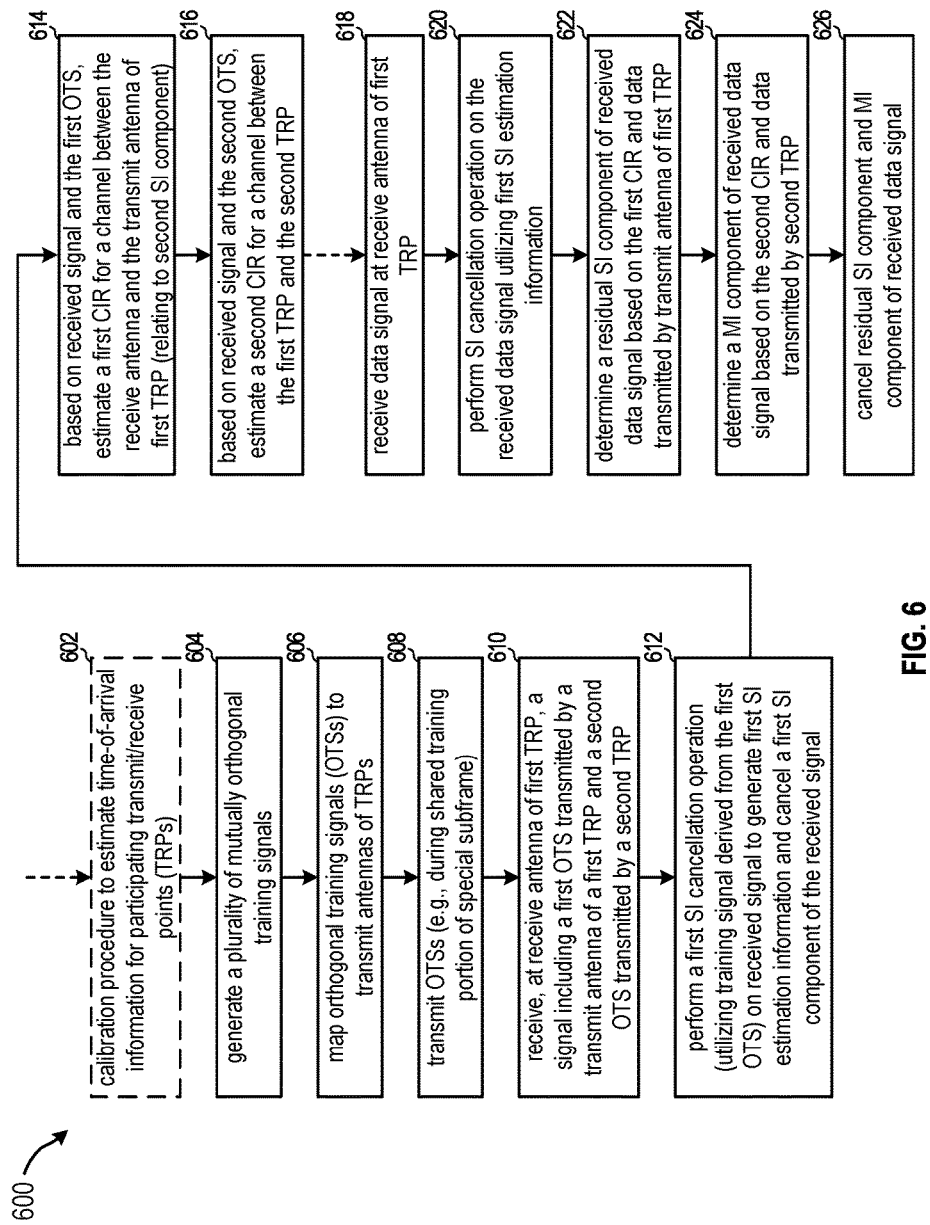
FIG. 6 is a logic diagram illustrating an example of interference cancellation in a full-duplex enabled network in accordance with the present disclosure.

FIG. 6 is a logic diagram 600 illustrating an example of interference cancellation in a full-duplex enabled network in accordance with the present disclosure. In this example, channel estimation/CIR information is generated and utilized to cancel SI and MI in a received data signal. Various of the illustrated operations may be performed, for example, by one or more FD TRPs operating in a distributed manner or in combination with one or more central access units or a C-RAN, such as illustrated in FIGS. 4 and 5.

In the illustrated example, channel estimation operations involving mutually orthogonal training signals are preceded by a calibration procedure (block 602) that estimates time-of-arrival (TOA)/propagation delay information for participating TRPs. The calibration procedure, an example of which is described in conjunction with FIGS. 9 and 10, may be performed once in a system-level calibration procedure or, alternatively, on a periodic, scheduled or as-needed basis. Next, a plurality of mutually orthogonal training signals (also referred to as OTSs) are generated (block 604) for use in generating estimations of CIRs for communication channels between various transmit and receive antennas of the participating TRPs. Each of the training signals could be a ZCZ signal or any other type of signal satisfying equation (3) below and otherwise meeting system requirements such as described herein. As noted, the mutually orthogonal training signals can be generated by one or more individual TRPs, a central access unit or C-RAN, or combinations thereof. Further, the calibration procedure of block 602 may utilize orthogonal training signals, such as those generated at block 604, or other appropriate training signals.

The OTSs are then mapped to individual transmit antennas of the TRPs (block 606), and transmitted at block 608. Transmission of the OTSs occurs, for example, during a shared training portion of a subframe such as shown in FIG. 7. The transmitted OTS are received by receive antennas of the participating TRPs. In an example (block 610), a receive antenna of a first TRP receives a signal that includes a first OTS transmitted by a transmit antenna of the first TRP and a second OTS transmitted by a transmit antenna of a second or distinct TRP. Additional OTSs of the plurality of OTSs may likewise be concurrently received by the receive antenna of the first TRP. A TRP may contemporaneously receive other data in addition to the transmitted OTSs (at another receive antenna, in other frames/sub-frames, etc.).

The first TRP of the illustrated example then utilizes a training signal derived from the first OTS during transmission thereof to perform at least a first, or partial, SI cancellation operation (block 612) on the received signal (which includes the first and second transmitted OTSs). Although not separately illustrated, multiple such partial SI cancellation operations can be performed on signals received at other receive antennas of the first TRP and/or other participating TRPs, and can include cancellation operations utilizing one or more additional training signals derived from an associated OTS (e.g., narrowband signals, non-orthogonal signals, analog or digital domain signals, etc.).

Based at least in part on the received signal and the first OTS, a first CIR is then estimated (block 614) for a wireless channel between the transmit antenna and the receive antenna of the first TRP. In addition, the received signal, as well as the second OTS or (transmission) information relating to the second OTS, is utilized to estimate a second CIR (block 616) for a wireless channel between the first TRP (e.g., one or more receive antennas of the first TRP that receives the second OTS) and the second TRP (e.g., one or more transmit antennas of the second TRP used to transmit the second OTS).

Upon receiving a data signal (e.g., from a wireless data stream during normal network communications, control signaling, etc.) at a receive antenna of the first TRP (block 618), a SI cancellation operation is performed on the (block 620). This SI cancellation operation utilizes the first SI estimation information. As discussed above, multiple such SI cancellation operations, including cascaded SI cancellation operations, can be performed utilizing SI estimation information determined using training signals derived from transmitted OTSs.

A residual SI component of the received data signal is then determined (block 622) based on the first CIR and data transmitted by the transmit antenna of the first TRP. An MI component of the received data signal is also determined (block 624) based on the second CIR and data transmitted by the TRP. Once determined, the residual SI component and the MI component of the received data signal are cancelled (block 626), and the resulting interference-free or interference mitigated version of the received data signal is passed to a (centralized) demodulator for further processing. An example of SI/MI interference reconstruction and cancellation is described in conjunction with FIG. 11.

The following are non-limiting examples of orthogonal training signal generation and training period configurations in a FD-enabled multi-cell system in accordance with the present disclosure. In this example, the TRPs could take the form of microcells or picocells, and the cell size (radius) is considered to be in the range of [5, 100] meters. The relative frequency and phase synchronization requirements for microcells/picocells has been specified in Technical Specifications promulgated by the 3GPP as follows:

Frequency error minimum requirement: ±100 ppb.

Phase accuracy minimum requirement: ±1.5 μs.

The absolute time synchronization between a C-RAN and backhaul links is beyond the scope of this disclosure. In this example, the frequency and phase synchronization between TRPs is expected to be achieved, for example, by GPS links for each TRP or CPRI interfaces between the C-RAN servers of each TRP or by measurements during the calibration procedure. Accordingly, the frequency synchronization can be assumed to be near perfect for purposes of this disclosure and phase synchronization is subject to the uncertainties mentioned above.

The phase uncertainty of ±1.5 μs (or 3 μs in total) can be addressed by extending the propagation delay between TRPs, which is a factor in training signal design and SI/MI channel estimation. A calibration procedure for estimating the propagation delays between TRPs is described below in conjunction with FIGS. 9 and 10. Assuming stationary TRPs, this procedure only needs to be done once in the system calibration procedure, but may also be performed on a periodic, scheduled or as-needed basis.

Assuming an LTE baseband sampling rate of 30.72 MHz (Ts=1/30.72 μs), combining the worst case phase uncertainty (3 μs, $T_e T_s$) and physical propagation delay (0.34 μs, $T_d T_s$) between two TRPs yields the total "equivalent" propagation delay:

TRP-TRP maximum propagation delay ($T_m T_s$, $T_m = T_e + T_d$)=3.34 μs.

Based on the modeling of filters in TRP transmit and receive paths and the delay spread of multipath channel, the number of taps (at the 30.72 MHz sampling rate) required for the channel estimation of TRP-TRP MI is in the range of [100, 300], which suggests that TRP-TRP MI channel maximum delay spread ($L_m T_s$)=9.8 μs.

The cyclic prefix (CP) length required by the orthogonal training signals is the sum of the two delay values above, or 13.14 μs, which corresponds to 403 LTE baseband samples. For margin, the CP length for the training signals of this example is set at 450 samples at the LTE baseband sampling rate. The total length of the training signal (with CP) is chosen to be 2560 samples, which is the length of an extended OFDM symbol in LTE. It follows that the length of the ZCZ sequence that performs cross-correlations for channel estimation is 2110 samples (2560—CP length). The parameters for an exemplified design of a training signal and the training period are summarized in Table 1 below.

TABLE 1

Parameters for an orthogonal training signal and training period

| TRP-TRP max propagation delay, $T_m T_s$ | TRP-TRP max ch. delay spread, $L_m T_s$ | min. CP length | CP length by design, $N_{CP} T_s$ | ZCZ seq. length by design, $NT_s$ | Training signal length by design, $(N + N_{CP}) T_s$ | Training period length |
|---|---|---|---|---|---|---|
| 103Ts | 300Ts | 403Ts | 450Ts | 2110Ts | 2560Ts | 2560Ts |

Figure 7:
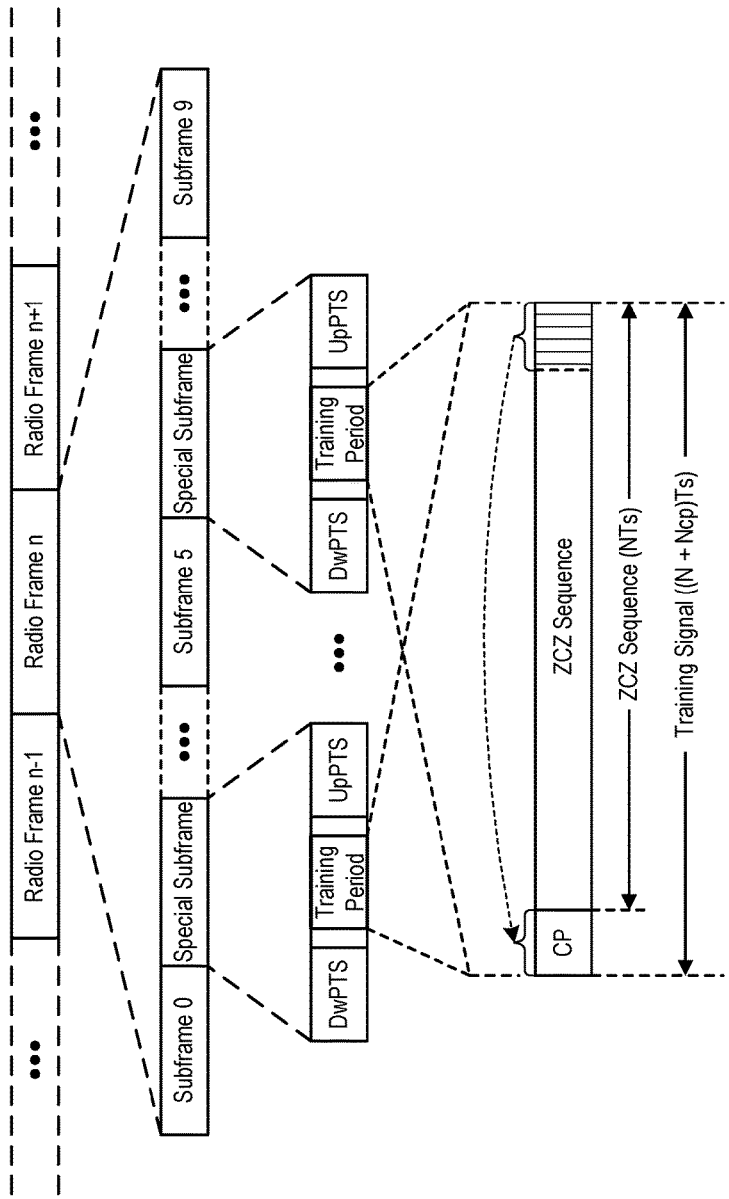
FIG. 7 illustrates an example frame structure including a sequence of subframes in accordance with the present disclosure.

FIG. 7 illustrates an example frame structure including a sequence of subframes in accordance with the present disclosure. The illustrated frame structure of this example is applicable to an air-interface based on an LTE-TDD frame structure. A detailed discussion presenting various frame structures supporting full-duplex operation, an LTE-compatible air-interface design providing flexible allocation of resource configuration, and dedicated training periods for FD operation in multi-cell applications is presented in U.S. Utility application Ser. No. 14/617,679, filed Feb. 9, 2015 and hereby incorporated herein by reference. The methodologies of the present disclosure are applicable to other types of frame structures, standardized communication protocols, and extensions thereof.

In the example of FIG. 7, a radio frame n is included in a sequence of radio frames n−1, n, n+1, etc. Each radio frame is composed of a sequence of subframes 0-9. In the illustrated configuration, the sequence of subframes includes a pair of special subframes (e.g., subframes 1 and 6 of a 3GPP LTE TDD compliant communications system), but can also include other numbers of special subframes. According to an example embodiment, a full-duplex device makes use of the special subframes (e.g., subframes complying with the parameters of Table 1) for use in transmitting the orthogonal training signals during a shared training period. In general, each of the special subframes includes downlink pilot time slot (DwPTS), a training portion (or training period/guard period), and an uplink pilot time slot (UpPTS). The remaining subframes are utilized for normal uplink/downlink communications. The representative training signal of this example includes a ZCZ sequence of length $NT_s$ and a cyclic prefix (CP) of length $N_{CP}T_s$, such that the total length of the training signal is $(N+N_{CP})T_s$. It is noted that the length of the CP need not necessarily match the normal or extended CP length specified in an LTE standard. Further, the length, as well as the periodicity, of the shared training period may be dependent upon environmental and/or communication system factors.

The reuse of existing subframe configurations, such as shown in FIG. 7, helps maintain compatibility with legacy devices and minimize changes to existing technical standards. These considerations may help improve adoption of full-duplex TRPs and minimize expenditures in implementing full-duplex communications systems. In general, the training period can be reserved in any of the downlink portions of a radio frame (e.g., the DwPTS of a special subframe or any slot of a downlink subframe).

ZCZ sequences suitable for use as orthogonal training signals can be generated, for example, based on a Zadoff-Chu sequence and its cyclic shifts. A base Zadoff-Chu sequence can be defined by $$s(n) = s_Z(n) = \begin{cases} e^{j\pi u n^2 / N}, & N \text{ is even} \\ e^{j\pi u n(n+1)/N}, & N \text{ is odd} \end{cases}, n = 0, 1, \ldots, N-1. \quad (1)$$

where N=2110 and u=1053 for this example. The value of u is selected to minimize the peak-to-average power ratio (PAPR) of the sequence following the low-pass filter/EMF stages of the TRPs. In general, u is chosen to be close to but less than [N/2], and u and N are relatively prime.

An alternative to ZCZ sequences is the generalized chirp-like (GCL) sequence, which can be built by modulating any Zadoff-Chu sequence with a block of random phase rotations $$s(n)=s_z(n)\cdot\exp\{\varphi(n \bmod m_g)\}. \; n=0,1,\ldots,N-1. \quad (2)$$

In this further example, N=2116, $m_g$=46 and $\varphi(k)$ can be a random variable that is uniformly distributed over [0, 2π], k=0, . . . $m_g$−1. For purposes of maintaining the same training signal length as in Table 1, the CP length for the alternative ZCZ is 444. The random phase modulation results in the GCL sequence behaving similarly, in terms of PAPR, to surrounding DL data (e.g., random QAM symbols) when passing through a low-pass filter such as the EMF stage. In the following, s(n) is used to represent any type of ZCZ sequence that fulfills the relevant PAPR requirement following a low-pass filter stage of a TRP.

For the maximum delay spread of $L_m$=300 samples evaluated above, a total number of six (6) ZCZ sequences can be generated from the cyclic shifts of the base Zadoff-Chu sequence s(n). Each of the sequences can be assigned to a distinct transmit antenna in a FD network. For a 2×2 MIMO configuration ($N_k$=2, q=1,2, . . . , $N_k$) in a TRP such as TRP 102, this number of ZCZ sequences is sufficient for a FD network with up to three ($K_b$=2, k=0, . . . $K_b$) TRPs. Specifically, the ZCZ sequence for each of the antennas in each of the TRPs can be derived by $$s_{q,k}(n)=s((n+(kN_k+q-1)N_{cyc})\bmod N), n=0,1,\ldots, N-1. \quad (3)$$

where k is the index of the TRP in the FD network (k=0, . . . $K_b$, $K_b$=2) and q is the transmit (or Tx) antenna port number on a TRP (q=1,2, . . . , $N_k$, $N_k$=2 for 2T2R or 2×2 MIMO);

$$N_{cyc} = \left\lfloor \frac{N}{(K_b + 1)N_k} \right\rfloor = 351,$$

which is the number of cyclic shifts and is no less than $L_m$. The training signal transmitted from the q-th antenna on the k-th TRP would be a $(N+N_{CP})\times 1$ vector $$x_{q,k} = \begin{bmatrix} x_{q,k}(0), x_{q,k}(1), \ldots, x_{q,k}(N_{CP}-1), \\ x_{q,k}(N_{CP}), \ldots, x_{q,k}(N+N_{CP}-1) \end{bmatrix}^T = \begin{bmatrix} s_{q,k}(N-N_{CP}), s_{q,k}(N-N_{CP}+1), \ldots, s_{q,k}(N-1), \\ s_{q,k}(0), s_{q,k}(1), \ldots, s_{q,k}(N-1) \end{bmatrix}^T, \quad (4)$$

where the first $N_{CP}$ symbols are the cyclic prefix (CP) copied from the end of the original ZCZ sequence as shown in FIG. 7. It is noted that this design methodology is extensible to a network incorporating a greater number of TRPs/transmit antennas by lengthening the ZCZ sequence in one shared training period and/or utilizing multiple such training periods. Further, the design parameters described herein are for illustrative purposes, and the choices of parameters (e.g., length and type of orthogonal training signals and CPs) can be tailored for different applications and performance requirements.

Turning now to SI estimation and cancellation in a TRP in accordance with the present disclosure, one or more training signals derived from an orthogonal training signal (as transmitted by the TRP) are utilized to perform partial SI cancellations. As generally described above with reference to FIGS. 4 and 5, derived (from orthogonal training signals) training signals and data samples used in cascaded channel estimation and SI reconstruction stages are taken following an EMF stage. It is noted that a derived training signal following the EMF stage is no longer a ZCZ sequence, and does not possess orthogonality between antennas and TRPs. The conventional least-square (LS) based channel estimation algorithm can be used with this type of non-orthogonal training signal, provided the involved matrix inversion and the required storage for pre-computed matrix inversions are manageable.

An advantage of deriving training signals that follow an EMF stage is that it permits satisfactory cancellation performance utilizing a channel estimator and canceller having a smaller number of taps than that of the delay spread of the overall channel impulse response. One design consideration is that this arrangement generally uses matrix inversion in the LS-based channel estimation, and the associated numerical issues for a large matrix may present practical limitations. In the examples illustrated in FIGS. 4 and 5, this type of channel estimation is used for SI cancellation in a local TRP. Another potential consideration is that in the presence of TRP-TRP MI, the SI cancellation performance of a TRP could be limited by the level of MI present. A benefit of the described architectures is that the residual of SI cancellations in previous stages can be jointly cancelled with the MI as elaborated below, and there is no resulting performance penalty due to the coexistence of SI (residual) and MI in the joint cancellation operation.

By virtue of the orthogonality of the training signals between any pair of Tx antennas and the (effectively) perfect autocorrelation and cross-correlations over the entire delay spread of the SI and MI channels, the estimation of the multipath channel between the p-th receive (or Rx) antenna on $TRP_0$ and q-th Tx antenna on $TRP_k$ can be reduced to a number of cross-correlations $$\hat{h}_{p,q,k} = \frac{1}{N\sigma_x^2} X_{p,q,k}^H y_p, \quad (5)$$

$$p = 1 \ldots M_k; q = 1, \ldots N_k; k = 0, \ldots K_b,$$

where $M_k$ is the number of Rx antennas at $TRP_0$ and $N_k$ is the number of Tx antennas at $BS_k$. $K_b$ is the number of TRPs that generate MIs to $TRP_0$, and $\sigma_x^2$ is the average power of the training signal samples $S_{q,k}(n)$. It is noted that k=0 is the channel estimate for SI, and is utilized when further reduction of the residual of SI cancellation (MI and SI joint cancellation) is performed. That is, by estimating the CIR of SI in the presence of MI but without the influence from MI (and vice versa), an uncompromised SI cancellation operation can be performed in the presence of MI. Similarly, it is demonstrated that the estimation of CIR of MI and the cancellation of MI are not meaningfully influenced by the presence of SI.

In the above, $y_p$ is an $N\times 1$ vector of Rx samples from the p-th Rx antenna on $TRP_0$, which may have been processed by a first stage or multiple stages of SI cancellation. It has the form of $$y_p = [y_p(n_{p,0}), y_p(n_{p,0}+1), \ldots, y_p(n_{p,0}+N-1)]^T, \quad (6)$$

where $n_{p,0}$ is an offset for the received samples such that the samples are aligned with the intended training signals $X_{p,q,k}$ for channel estimation. The offset is a result of timing synchronization or calibration procedure such as described in conjunction with FIGS. 9 and 10.

The matrix $X_{p,q,k}$ is an $N\times L_{p,q,k}$ channel convolution matrix with the training signal from the q-th antenna on the $TRP_k$ $$X_{p,q,k} = \begin{bmatrix} x_{q,k}(N_{CP}-m_{p,q,k}) & x_{p,k}(N_{CP}-m_{p,q,k}-1) & \ldots & x_{q,k}\left(\begin{array}{c}N_{CP}-m_{p,q,k}-\\ L_{p,q,k}+1\end{array}\right) \\ x_{p,k}(N_{CP}-m_{p,q,k}+1) & x_{q,k}(N_{CP}-m_{p,q,k}) & \ldots & x_{q,k}\left(\begin{array}{c}N_{CP}-m_{p,q,k}-\\ L_{p,q,k}+2\end{array}\right) \\ \ldots & \ldots & \ldots & \ldots \\ x_{q,k}(N_{CP}-m_{p,q,k}+N-1) & x_{q,k}(N_{CP}-m_{p,q,k}+N-2) & \ldots & x_{q,k}\left(\begin{array}{c}N_{CP}-m_{p,q,k}+\\ N-L_{p,q,k}\end{array}\right) \end{bmatrix}, \quad (7)$$

where $L_{p,q,k}$ is the number of taps of the channel and $m_{p,q,k}$ is an offset of the training (reference) signals for channel estimation between Rx antenna p on $TRP_0$ and the Tx antenna q on $TRP_k$, and is another output of the calibration procedure described below. The formation of the matrix can take advantage of the cyclic prefix in the transmitted training signal $X_{q,k}$ of equation (4), and it can be conveniently constructed by a series of circular shifts of the base training sequence $s_{q,k}(n)$ of equation (3). That is, $$X_{p,q,k} = \begin{bmatrix} circshift(s_{q,k}, m_{p,q,k}), circshift(s_{q,k}, m_{p,q,k}+1), \ldots, \\ circshift(s_{q,k}, m_{p,q,k} + L_{p,q,k} - 1) \end{bmatrix}, \quad (8)$$

where circshift is a MATLAB function for circular shifting and $s_{q,k}$ is an N×1 vector of the training sequence $$s_{q,k} = [s_{q,k}(0), s_{q,k}(1), \ldots, s_{q,k}(N-1)]^T. \quad (9)$$

From equations (5)-(7) above, it can be seen that the number of channel taps for each of the Tx-Rx antenna pairs can be set individually and differently from each other, although it is practically convenient to assume that the number of taps is the same for any pair of Tx-Rx antennas between two TRPs.

Turning now to joint MI/SI cancellation in a FD system, the channel estimation of (5) is an $L_{p,q,k} \times 1$ vector $$\hat{h}_{p,q,k} = [h_{p,q,k}(0), h_{p,q,k}(1), \ldots, h_{p,q,k}(L_{p,q,k}-1)]^T. \quad (10)$$

The reconstructed canceling signal can be written as $$\hat{y}_p(n) = \sum_{k=0}^{K_b-1} \sum_{q=1}^{N_k} \sum_{l=0}^{L_{p,q,k}-1} h_{p,q,k}(l) x_{q,k}(n - \tau_{p,q,k} - l), \quad (11)$$

$$n = 0, 1, \ldots$$

where $x_{q,k}(n)$ is the stream of transmit samples before EMF for antenna port q on $TRP_k$. Note that the offsets of transmit samples ($\tau_{p,q,k}$, equation (20) below) are adjusted with either advance or delay relative to Rx reference timing depending on the TOA estimates discussed below. Both MI and SI are cancelled because all TRPs, including $TRP_0$, are referenced in equation (11).

Finally, the interference is canceled (see, e.g., FIG. 11) from the received samples by $$z_p(n) = y_p(n) - \hat{y}_p(n), \quad (12)$$

where $z_p(n)$ is an interference free or mitigated version of the received data signal that is passed to an uplink demodulator for further processing.

Figure 8:
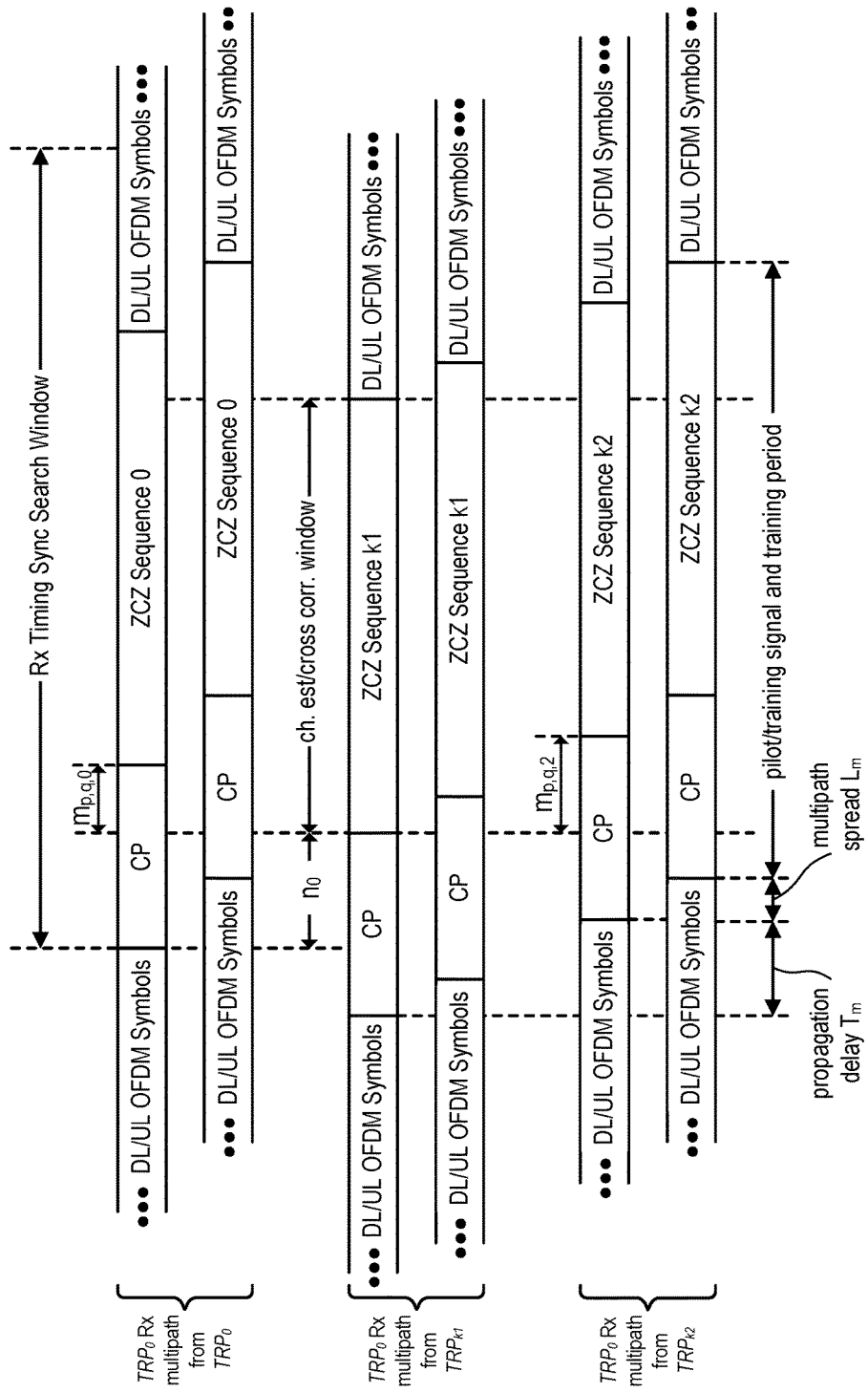
FIG. 8 illustrates training periods having a common channel estimation window that accommodates propagation delays and multipath spread in accordance with the present disclosure.

FIG. 8 illustrates training periods having a common channel estimation window that accommodates propagation delays and multipath spread in accordance with the present disclosure. Due to the dynamics of phase synchronization errors and propagation delays between TRPs, timing synchronization for the signals received from each transmitting TRP is employed for MI and SI channel estimation and reconstruction in accordance with embodiments of the disclosure. The results of the timing synchronization, or calibration procedure, are the proper timing offsets for the received samples in $TRP_0$ and the corresponding offset for the training signal of a transmitting $TRP_k$ that is targeting $TRP_0$.

The time-of-arrivals (TOAs) of received signals at an Rx TRP ($TRP_0$) from surrounding Tx TRPs are illustrated in FIG. 8 by an example where MI signals from $TRP_{k1}$ and $TRP_{k2}$ arrive earlier and later, respectively, than an SI signal arrives at $TRP_0$. This situation is possible due to potential phase synchronization errors between TRPs, which could cause a $TRP_k$ to transmit earlier or later than $TRP_0$ by as much as 1.5 µs, which corresponds to a propagation distance of 450 meters. When the actual distance between $TRP_0$ and $TRP_k$ is less than 450 meters, early arrival of MI signals from $TRP_k$ may occur at $TRP_0$.

The phase uncertainties, total propagation delays and multipath spread of an example FD system can be handled by the design of training signals, provided the maximum delay difference between the earliest and latest arriving signals is less than the length of the cyclic prefix of the training signal. In FIG. 8, it is assumed that signals from $TRP_{k1}$ arrive the earliest and signals from $TRP_{k2}$ arrive the latest.

To find the common window for channel estimation/cross-correlation determination as shown in FIG. 8, it is necessary to estimate the TOA for the transmitting antennas of each participating TRP. One method for performing the TOA estimation includes finding the timing offset of the peak of cross-correlation between training signal $s_{q,k}$ of equation (9) and the received samples $y_p(n)$. A Rx timing synchronization search window of $[N_{CP}-T_e/2, N_{CP}+T_e/2]$ is expected to cover the maximum range of uncertainty with respect to the start of transmit boundaries at $TRP_0$, which serves as a timing reference for the TOA estimation. $T_e$ is the maximum phase error between TRPs. Specifically, $$r_{p,q,k}(\tau) = \sum_{n=0}^{N-1} s_{q,k}^*(n) y_p(n+\tau), \quad (13)$$

$$\tau = N_{CP} - T_e/2, \ldots, N_{CP} + T_e/2,$$

represents the cross-correlations between received samples and Tx antenna q on $TRP_k$; and $$\tau_{p,q,k} = \arg\max_\tau \{|r_{p,q,k}(\tau)|\} - \frac{T_e}{2} - \tau_g \quad (14)$$

represents the timing offsets of the correlation peaks.

The timing offset of the received MI with the earliest TOA is then given by $$\tau_{p,0} = \min_{q,k} \{\tau_{p,q,k}\}. \quad (15)$$

where $\tau_g$ is the maximum of the overall group delays of filters between any Tx-Rx TRP pair. $\tau_g$ is a static parameter that can be measured in a calibration procedure such as described below in conjunction with FIGS. 9 and 10. It is noted that the estimate of a timing offset includes the propagation delay and group delay of the filters in the transmitting and receiving TRPs. In order for the channel estimation to cover the response of those filters, the maximum of the overall group delays of the filters is removed from the estimated timing offset. The offset for the received samples in (6) used in channel estimation is a result of $$n_{p,0} = \tau_{p,0} + N_{CP}. \quad (16)$$

Another offset utilized for shifting the training signal and composing the channel convolution matrix in equations (7) or (8) is given by $$m_{p,q,k} = \tau_{p,q,k} - \tau_{p,0}. \text{ tm } (17)$$

Figure 9:
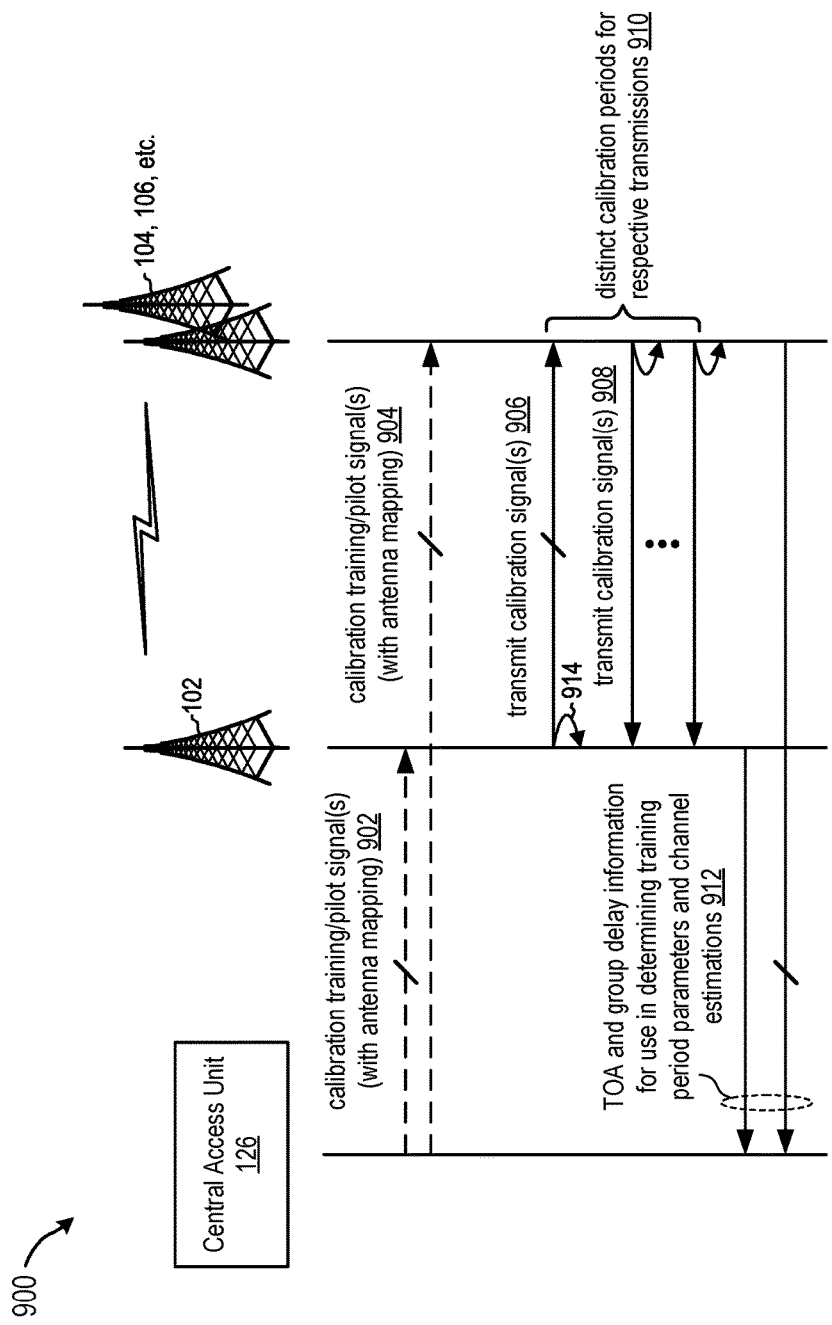
FIG. 9 illustrates transmission of calibration training signals during an example calibration procedure to generate time-of-arrival estimation information in accordance with the present disclosure.

FIG. 9 illustrates transmission of calibration training signals during an example calibration procedure to generate time-of-arrival (TOA) estimation information in accordance with the present disclosure. In the illustrated timing diagram 900, TRPs are assumed to be stationary and TRP-TRP TOA estimations can be performed in a calibration procedure such as described below in conjunction with FIG. 10. A group of FD TRPs 102-106 are arranged by a central controller (e.g., a C-RAN or central access unit 126) to participate in the calibration procedure.

In general, a unique calibration period in time and frequency is reserved for each of the participating TRPs 102-106. An example of such a calibration period can be the training period shown in FIG. 7, wherein the calibration period utilizes the whole channel bandwidth and lasts an extended LTE OFDM symbol period in time. In each calibration period, only the TRP for which the calibration period is reserved is allowed to transmit (preferably in a single-input-single-output (SISO) mode), while all other TRPs and the transmitting TRP itself are in a receiving mode. An example of the transmitted calibration training signal can be a training signal designed in accordance with FIG. 7.

In the illustrated timing diagram 900, calibration training signals are determined by the central access unit 126 and communicated (at 902/904) to TRPs 102-106 (e.g., via a fronthaul link such as shown in FIG. 4) for transmission during respective distinct calibration periods 910. In some embodiments, the central access unit 126 may further communicate a mapping of the calibration training signals to respective transmit antennas of the TRPs 102-106. According to other embodiments (such as the distributed embodiment of FIG. 5), one or both of the calibration training signals and associated transmitter antenna mappings are generated by processing circuitry of the TRPs 102-106.

In the illustrated example, the TRP 102 transmits a calibration training signal (at 906) during a reserved calibration period, and TRPs 104 and 106 transmit calibration training signals (at 908) during respective reserved calibration periods. In this example, TOA and group delay information for use in determining training signal parameters and channel estimations is communicated (at 912) to the central access unit 126 for use as described herein.

During each calibration period, the transmitting TRP receives its own "leaked" signal (e.g., at 914 for TRP 102), which is considered self-interference (SI). This signal is used to measure the total group delay in its transmitter and receiver via, e.g., cross-correlations from the beginning of the calibration period:

$$r_p(\tau) = \sum_{n=0}^{N-1} s_{1,0}^*(n)y_p(n+\tau), \tau = 0, \ldots, 2N_{CP}; \quad (18)$$

$$\tau_g = \underset{\tau}{\mathrm{argmax}}\{|r_p(\tau)|\} - N_{CP}. \quad (19)$$

These equations are based on the example orthogonal training signal described in equations (1)-(4). Here, $\tau_g$ is the total delay between the test points $B_k$ and $H_k$ shown in FIGS. 4 and 5, and is used in the TOA estimation in equation (14). Note that estimated include the group delays associated with the filters in Tx and Rx chains, plus the processing latency associated with real-time pipelining in the hardware/firmware/software (e.g., FPGAs and DSPs) of the Tx and Rx chains. For purposes of the described TOA estimation procedure, the Tx and Rx chains are considered together. Processing latency can be addressed, for example, by the channel truncation approach described below.

During each calibration period, the non-transmitting TRPs receive the calibration training signal from the only transmitting TRP. This signal is used to measure the propagation delay between test points $B_{k_1}$ and $H_{k_2}$ ($k_1 \neq k_2$) shown in FIGS. 4 and 5, and by equations (13) and (14), for example.

Figure 10:
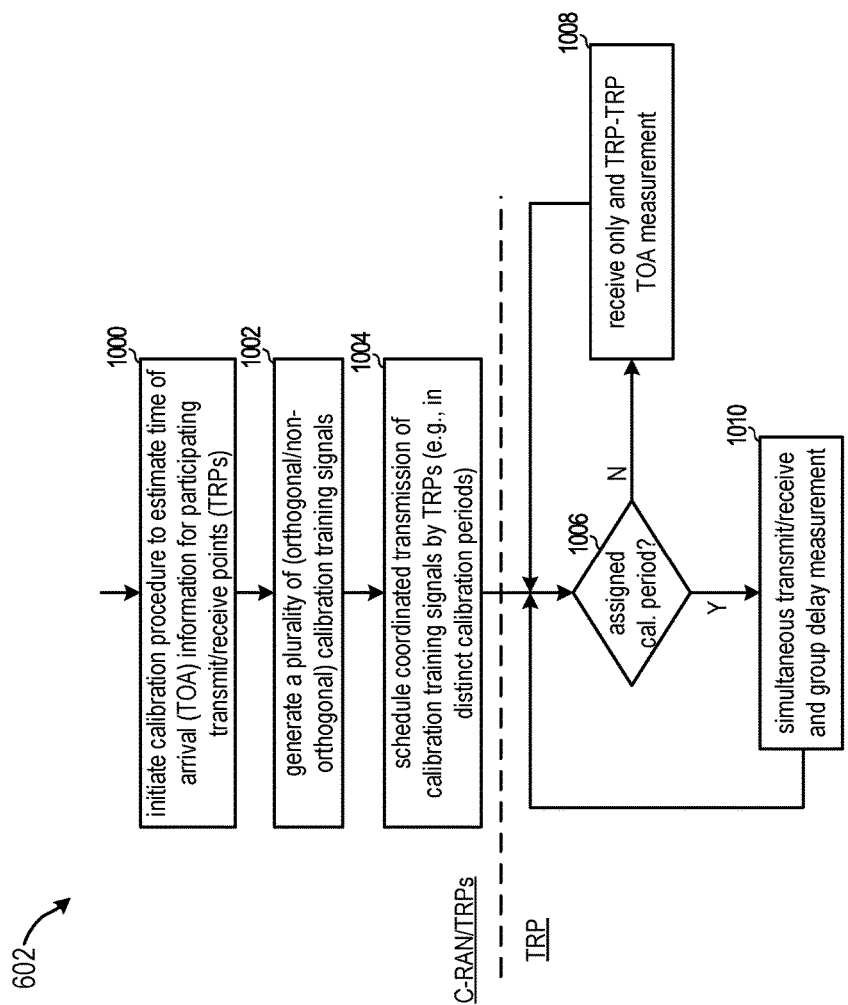
FIG. 10 is a logic diagram illustrating an example calibration procedure to estimate time-of-arrival information in accordance with the present disclosure.

FIG. 10 is a logic diagram illustrating an example calibration procedure (e.g., block 602 of FIG. 6) to estimate time-of-arrival (TOA) information in accordance with the present disclosure. In particular, the operating states of a participating TRP are shown (at blocks 1006-1010). Upon initiation of a calibration procedure 602 to estimate TOA information for signals communicated between different pairings of transmit antennas and receive antennas of the participating TRPs (block 1000), a plurality of (orthogonal or non-orthogonal) calibration training signals are generated (block 1002) or otherwise determined as described above and made available to the participating TRPs. Next, at block 1004, coordinated transmission of the calibration training signals by the TRPs is scheduled for distinct calibration periods. Some or all of the foregoing operations can be performed by a centralized controller, the TRPs, or a combination thereof.

With reference to an individual one of the participating TRPs, the TRP operates to determine (block 1006) if an assigned calibration period of the calibration procedure has been reached (i.e., when the TRP is scheduled to transmit a calibration training signal). If not, the TRP operates in a receive only mode to receive calibration training signals (block 1008) from other participating TRPs for use in TRP-TRP TOA measurements and generating a propagation delay value relating to a wireless channel between the TRP and the transmitting TRP. If the assigned calibration period has been reached, the TRP operates in a simultaneous transmit/receive mode and transmits a calibration training signal (block 1010). The TRP also receives the transmitted calibration training signal at a receive antenna for use in performing group delay measurements such as described above.

The presence of multipath reflections between TRPs may affect the accuracy of the TOA estimates when using a peak finding approach with, e.g., the cross-correlations in equations (13) and (14). The peak of the overall CIR, which is the convolution of the CIRs of the filters in a Tx-Rx chain and the CIR of the multipath channel, may shift due to the random profile of the multipath CIR. For example, the peak of the overall CIR of a channel could be shifted (delayed) by a few samples relative to that of the CIR of the filters. Because the estimation of TOA in equation (14) is based on the peak position of the overall CIR, retreated by the group delay of the filters, the shift of the CIR peak may cause an error in the TOA estimate, which in turn may cause a miss of some of taps in channel estimation, as shown by equations (5), (6), (7), (16) and (17).

To rectify the potential effect on channel estimation, equation (14) can be modified by $$\tau_{p,q,k} = \underset{\tau}{\mathrm{argmax}}\{|r_{p,q,k}(\tau)|\} - \frac{T_e}{2} - \tau_g - b_{p,q,k}, \quad (20)$$

where $b_{p,q,k}$ is an empirical number which can be observed in a multipath environment for a given multi-cell configuration.

As noted above, processing delays of the transmit and receive circuitry of a TRP can be included in group delay estimations. A given processing delay can be treated, for example, as a CIR extension with zero taps. In this case, the zero taps do not need to be included as part of channel estimation. In other cases, some of the CIR taps may be small enough that they can be ignored without incurring a meaningful performance penalty. Accordingly, truncated channel estimation can be desirable. The number of truncated taps on each end of a CIR estimation can be calculated by $$m_{cet} = \tau_g - \frac{L_{p,q,k} - L_{mpc}}{2}, \quad (21)$$

where $L_{p,q,k}$ is the actual number of overall channel taps to be estimated in equation (7), and $\tau_g$ is the group delay estimate by equation (19). is the actual number of taps of the multipath channel, which can be estimated, for example, by offline channel sounding and observation. $m_{cet}$ can be combined with the cyclic shifts of an orthogonal training signal for channel estimation by modifying equation (17) as $$m_{p,q,k} = \tau_{p,q,k} - \tau_{p,0} + m_{cet}. \quad (22)$$

Figure 11:
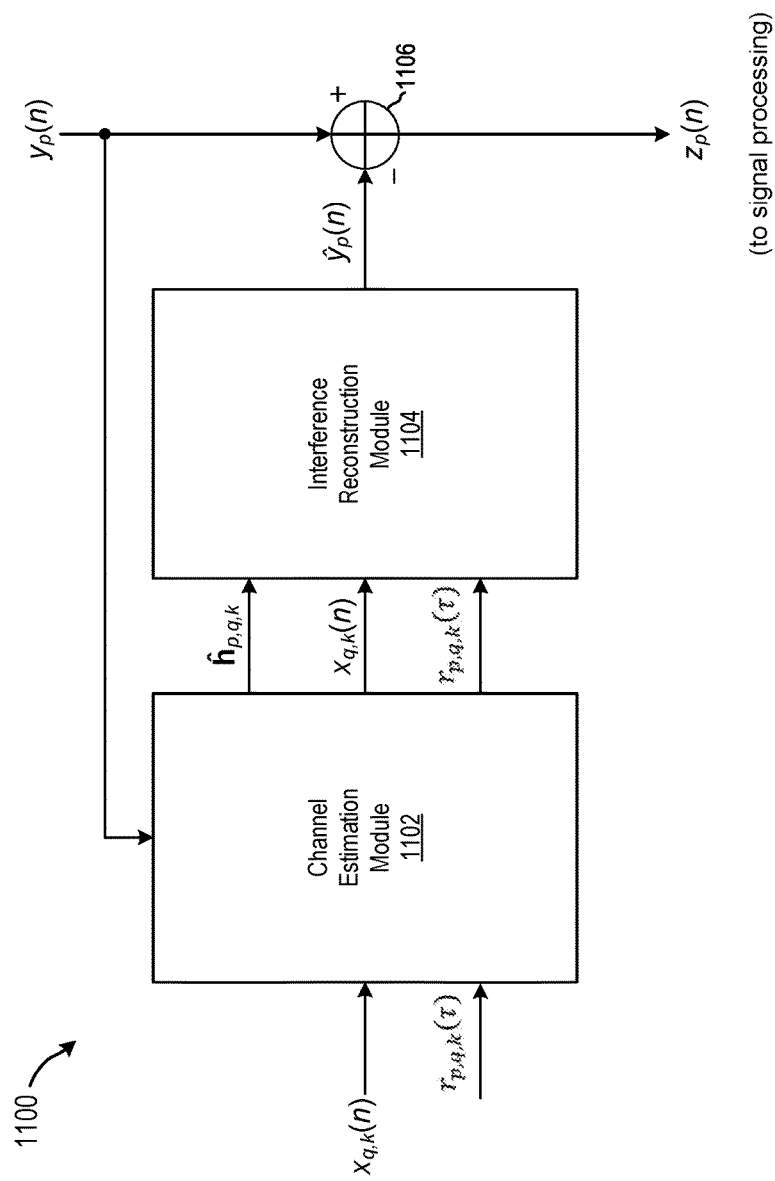
FIG. 11 illustrates an example interference cancellation module in accordance with the present disclosure.

FIG. 11 illustrates an example interference cancellation module 1100 in accordance with the present disclosure. The interference cancellation module 1100 can be included, for example, in canceller S4 432 of FIG. 4 or canceller S4 532 of FIG. 5, and can operate in a multi-phase mode. In a first phase, the interference cancellation module 1100 generates channel estimation information, such as CIR estimations and/or SI estimation information, using channel estimation module 1102. Channel estimation may be performed by the channel estimation module 1102, for example, utilizing the transmitted orthogonal training signals $x_{q,k}(n)$ and TOA/group delay information determined during the calibration procedure described in conjunction with FIGS. 9 and 10 (e.g., $r_{p,q,k}(\tau)$). Although not separately illustrated, the channel estimation module can include, for example, a cyclic prefix module, a matrix multiplier, a scaling module, a sequence selector, a convolution matrix module, etc.

In a second phase, an interference reconstruction module 1104 reconstructs the SI and MI based on known transmitted data symbols, channel estimates (e.g., $\hat{h}_{p,q,k}$) produced by channel estimation module 1102, and the TOA/group delay information $r_{p,q,k}(\tau)$. A combiner 1106 operates generally to combine (i.e., subtract) the interference replica $\hat{y}_p(n)$ (as generated by interference reconstruction module 1104) with the received signal $y_p(n)$ to produce an interference free or mitigated version $z_p(n)$ of the received data signal. The information contained in $z_p(n)$ can then be processed by signal processing circuitry (e.g., demodulation and decoding circuitry).

Figure 12:
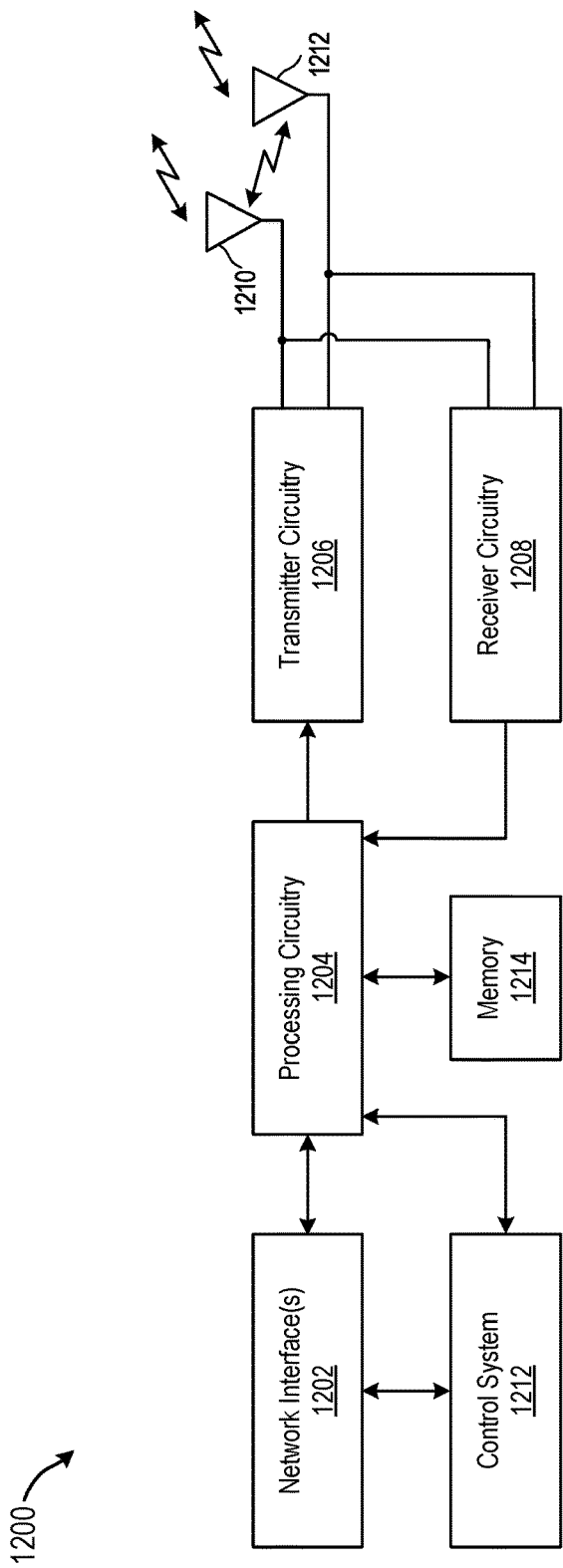
FIG. 12 is a block diagram representation of a transmit/receive point in accordance with an embodiment of the present disclosure.

FIG. 12 is a block diagram representation of a transmit/receive point (TRP) 1200 in accordance with an embodiment of the present disclosure. The TRP 1200 may be, for example, an eNB or other type of base station, or an UE capable of full-duplex operation. The TRP 1200 generally includes one or more network interfaces 1202, processing circuitry 1204, transmitter circuitry 1206, receiver circuitry 1208, a control system 1212, and memory 1214. The processing circuitry 1204 can include, for example, baseband processing circuitry, interference cancellation module 1100, a training signal generation module, a frame generation module, a signal mapping module, etc. The memory 1214 may be any type of memory capable of storing software and data.

The TRP 1200 of the illustrated embodiment further includes a plurality of antennas 1210 and 1212 configurable for use with the transmitter circuitry 1206 and the receiver circuitry 1208 (e.g., one or more transmit antennas and one or more receive antennas). In one example, at least one antenna 1210 is configured as a transmit antenna and at least one antenna 1212 is configured as a receive antenna. When the antenna 1210 is relatively close to, collocated with, or shared with antenna 1212, signals transmitted via antenna 1210 may appear at antenna 1212 at significantly higher power levels than transmissions made by remotely located TRPs that are transmitting to the full-duplex TRP 1200. Although TRP 1200 is shown in FIG. 12 as having collocated or shared antennas 1210 and 1212, alternative implementations of TRP 1200 may utilize one or more remotely located transmit and/or receive antennas.

The receiver circuitry 1208 receives radio frequency signals bearing information from one or more remote TRPs/UEs. Preferably, a low noise amplifier and a filter (not shown) cooperate to amplify and remove broadband interference from received signals for processing. Down-conversion and digitization circuitry (also not shown) will then downconvert the filtered, received signals to intermediate or baseband frequency signals, which are then digitized into one or more digital streams.

The processing circuitry 1204 processes the digitized received signals to extract information or data bits conveyed in the received signals. This processing typically includes demodulation, decoding, and error correction operations. Accordingly, the processing circuitry 1204 is generally implemented in one or more DSPs or application-specific integrated circuits (ASICs). The received information is then sent to an associated network via the network interface(s) 1202, or transmitted to another device or terminal serviced by the TRP 1200.

On the transmit side, the processing circuitry 1204 receives digitized data, which may represent training signals, voice, data, or control information, from the network interface(s) 1202 (e.g., an Xn interface) under the control of the control system 1212, and encodes the data for transmission. The encoded data is output to the transmitter circuitry 1206, where it is modulated by a carrier signal having a desired transmit frequency or frequencies. A power amplifier (not shown) will amplify the modulated carrier signal to a level appropriate for transmission, and deliver the modulated carrier signal to the antennas 1210/1212 through a matching network (also not shown). The TRP 1200 may concurrently transmit and receive signals using multiple antennas 1210/1212.

With respect to the central access unit described earlier, a similar architecture to that of FIG. 12 could be used, but with different interfaces and transmit/receive circuitry. For example, the transmit/receive circuitry may be for optical, DSL or any other communication scheme. If collocated with a transmit/receive point, a central access unit could reuse the processing circuitry and other components of the transmit/receive point as necessary (e.g., interfaces for communicating with other transmit/receive points, such as an Xn interface).

As may be used herein, the terms "configured to," "operably coupled to," "coupled to," and/or "coupling" include direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may also be used herein, inferred coupling (i.e., where one element is coupled to another element by inference) includes direct and indirect coupling between two items in the same manner as "coupled to". As may further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may even further be used herein, the term "associated with," includes direct and/or indirect coupling of separate items and/or one item being embedded within another item.

As may also be used herein, the terms "processing module," "processing circuitry," "processor," "baseband processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuitry, and/or processing unit may be, or further include, memory and/or an integrated memory element, which may be a single memory device, a plurality of memory devices, and/or embedded circuitry of another processing module, module, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuitry, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuitry, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined provided the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined provided the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, accordingly, the functions, steps, modules, etc. may be the same or similar functions, steps, modules, etc. or different ones.

Unless specifically stated to the contra, signals to, from, and/or between elements in a figure of any of the Figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. Although one or more particular architectures are described herein, other architectures can likewise be implemented that use one or more data buses not expressly shown, direct connectivity between elements, and/or indirect coupling between other elements as recognized by one of average skill in the art.

What is claimed is:

1. A method for cancelling self interference (SI) and mutual interference (MI) in signals received by a local full-duplex transmit/receive point (TRP) having at least one transmit and receive antenna, the method comprising:

determining a first orthogonal training signal from a plurality of orthogonal training signals, each transmit antenna of the local TRP having a unique orthogonal training signal;

mapping the first orthogonal training signal to a transmit antenna of the TRP;

transmitting the first orthogonal training signal via the transmit antenna;

receiving, by a receive antenna of the TRP, a signal including the first orthogonal training signal and at least a second orthogonal training signal from the plurality of orthogonal training signals, the second orthogonal training signal originating from a remote TRP;

performing a local TRP first stage SI cancellation operation on the received signal containing the first and second orthogonal signals, the local TRP first stage SI cancellation operation performed in accordance with a non-orthogonal training signal determined in accordance with the first orthogonal training signal and the transmitting of the first orthogonal training signal, to generate first stage SI estimation information and cancel a first stage SI component of the received signal;

generating an estimate of a first channel impulse response (CIR) of a wireless channel between the transmit antenna and the receive antenna, the generated first CIR estimate determined in accordance with the received signal and the first orthogonal training signal, the first CIR relating to the residue of the SI component of the received signal after the first stage SI cancellation; and generating an estimate of a second CIR of a wireless channel between the local TRP and the remote TRP for MI cancellation, the generated second CIR estimate determined in accordance with the received signal and transmission information related to the second orthogonal training signal.

2. The method of claim 1, further comprising:

receiving, at the receive antenna of the local TRP, a data signal;

performing a SI cancellation operation on the received data signal, the SI cancellation operation utilizing the first stage SI estimation information;

determining a residual SI component of the received data signal based on the first CIR and data transmitted by the transmit antenna of the local TRP;

determining a MI component of the received data signal based on the second CIR and data transmitted by the remote TRP; and cancelling the residual SI component and the MI component of the received data signal.

3. The method of claim 1, further comprising:

prior to generating the first and second CIR estimates, performing the first stage SI cancellation operation on the received signal to generate the non-orthogonal training signal SI estimation information and cancel the first stage SI component of the received signal, the first stage SI cancellation operation utilizing a further non-orthogonal training signal determined in accordance with the first orthogonal training signal.

4. The method of claim 1, further comprising:

transmitting, via the transmit antenna, a first calibration training signal during a first calibration period;

receiving, via the receive antenna, a second calibration training signal transmitted by the remote TRP during a second calibration period; and generating an estimate of a propagation delay value relating to the wireless channel between the local TRP and the remote TRP, based on the received second calibration training signal.

5. The method of claim 4, wherein estimating the first CIR and the second CIR is further based on the propagation delay value.

6. The method of claim 1, wherein the plurality of orthogonal training signals comprises zero correlation zone (ZCZ) sequences.

7. The method of claim 1, wherein the plurality of orthogonal training signals comprises Zadoff-Chu sequences modulated with blocks of random phase rotations.

8. The method of claim 1, wherein the determining of the first orthogonal training signal includes assignments by a centralized-radio access network (C-RAN) to the TRPs.

9. The method of claim 1, wherein the transmitting of the first orthogonal training signal via the transmit antenna occurs, at least in part, during a training portion of a subframe comprising a downlink portion, the training portion, and an uplink portion.

10. A method for cancelling self interference (SI) and mutual interference (MI) in signals received by a full-duplex transmit/receive point (TRP) having at least one pair of transmit and receive antennae, the method comprising:

determining a plurality of orthogonal training signals including at least a first orthogonal training signal for a local TRP and at least a second orthogonal training signal for remote TRP;

mapping the first orthogonal training signal to a transmit antenna of a first local TRP;

mapping the second orthogonal training signal to a transmit antenna of a second remote TRP;

communicating the first orthogonal training signal and the second orthogonal training signal to the first TRP and the second TRP, respectively, for concurrent transmission during a same training signal period;

receiving, from the first TRP, a non-orthogonal training signal determined in accordance with the first orthogonal training signal;

receiving, from the first TRP, a signal including the first orthogonal training signal and the second orthogonal training signal as received by a receive antenna of the first TRP;

performing a first stage SI cancellation operation on the received signal to generate first stage SI estimation information and cancel a first SI component of the received signal, the first stage SI cancellation operation utilizing the non-orthogonal training signal;

generating an estimate of a first channel impulse response (CIR) of a wireless channel between the transmit antenna and the receive antenna, the generated first CIR estimate determined in accordance with the first stage non-orthogonal training signal cancelled residue received signal and the first orthogonal training signal; and generating an estimate of a second CIR of a wireless channel between the local TRP and the remote TRP for MI cancellation, the generated second CIR estimate determined in accordance with the first stage non-orthogonal SI cancelled residue received signal and the first orthogonal training signal.

11. The method of claim 10, further comprising:

receiving, from the first TRP, a data signal;

performing a SI cancellation operation on the received data signal, the SI cancellation operation utilizing the first non-orthogonal training signal SI estimation information;

determining a residual SI component of the received data signal based on the first orthogonal training signal CIR and data transmitted by the transmit antenna of the first TRP;

determining a MI component of the received data signal based on the second orthogonal training signal CIR and data transmitted by the second TRP; and cancelling the residual SI component and the MI component of the received data signal.

12. The method of claim 10, further comprising:

receiving, from the first TRP, a non-orthogonal training signal determined in accordance with the first orthogonal training signal, wherein the first stage SI cancellation operation further utilizes the non-orthogonal training signal determined in accordance with the first TRP orthogonal training signal.

13. The method of claim 10, further comprising:

performing a calibration procedure to generate propagation delay estimates for signals communicated between the first and second TRPs, the calibration procedure including:

determining at least a first calibration training signal and a second calibration training signal;

assigning a MI calibration period to each of the first and second TRPs for respective transmission of the first calibration training signal and the second calibration training signal;
receiving, from the first TRP, the second calibration training signal from the remote TRP; and
estimating, based on the received second calibration training signal, a propagation delay value relating to the wireless channel between the first TRP and the second TRP.

14. The method of claim 13, wherein the estimating of the first CIR and second CIR is further based on the propagation delay value.

15. The method of claim 10, wherein the plurality of orthogonal training signals comprises zero correlation zone (ZCZ) sequences.

16. The method of claim 10, wherein the plurality of orthogonal training signals comprises a base Zadoff-Chu sequence and cyclic shifts thereof.

17. The method of claim 10, wherein the plurality of orthogonal training signals comprises Zadoff-Chu sequences modulated with blocks of random phase rotations.

18. The method of claim 10, wherein the concurrent transmission of the plurality of orthogonal training signals occurs, at least in part, during a training portion of a subframe comprising a downlink portion, the training portion, and an uplink portion.

19. The method of claim 10, wherein the communicating of the first orthogonal training signal and the second orthogonal training signal to the first TRP and the second TRP, respectively, includes an assignment by a central random access node.

20. A local apparatus for use in a wireless full-duplex network, the local apparatus comprising:
a transmitter operably coupled to a transmit antenna, the transmitter configured to transmit, via the transmit antenna, a first orthogonal training signal from a plurality of orthogonal training signals;
a memory;
processing circuitry operatively coupled to the memory;
a receiver operatively coupled to a receive antenna and the processing circuitry, the receiver configured to receive, via the receive antenna, a signal including the first orthogonal training signal and at least a second orthogonal training signal from the plurality of orthogonal training signals, the second orthogonal training signal originating from a remote apparatus; and
the processing circuitry configured to:
perform a first stage self interference (SI) cancellation operation on the received signal to generate first stage SI estimation information and cancel a first stage SI component of the received signal, the first stage SI cancellation operation utilizing a non-orthogonal training signal determined in accordance with the first orthogonal training signal by the transmitter;
generate an estimate of a first channel impulse response (CIR) of a wireless channel between the transmit antenna and the receive antenna, the generated first CIR estimate determined in accordance with the first stage SI cancelled residue received signal and the first orthogonal training signal, the first CIR relating to a residue SI component of the received signal; and
generate an estimate of a second CIR of a wireless channel between the local apparatus and the remote appratus for MI cancellation, the generated second CIR estimate determined in accordance with the received signal and transmission information relating to the second orthogonal training signal.

21. The apparatus of claim 20, the processing circuitry further configured to:
prior to generating an estimate of the first CIR and the second CIR, perform a first stage SI cancellation operation on the received signal to generate the non-orthogonal training signal estimation information and cancel the SI component of the received signal, the first stage SI cancellation operation based on a further non-orthogonal training signal determined in accordance with the first orthogonal training signal by the transmitter.

22. The apparatus of claim 20, wherein the non-orthogonal training signal determined in accordance with the first orthogonal training signal by the transmitter comprises a non-orthogonal version of the first orthogonal training signal, the training signal generated by the transmitter during transmission of the first orthogonal training signal.

23. The apparatus of claim 20, wherein the receiver is operable to receive a data signal, the processing circuitry further configured to:
perform a SI cancellation operation on the received data signal, the SI cancellation operation utilizing the first stage SI estimation information;
determine a residual SI component of the first stage SI cancelled residue of the received data signal based on the first CIR and data transmitted by the transmit antenna;
determine a MI component of the first stage SI cancelled residue of the received data signal based on the second CIR and data transmitted by the remote apparatus; and
cancel the residual SI component and the MI component of the received data signal.

24. The apparatus of claim 20, wherein:
the transmitter being further configured to transmit, via the transmit antenna, a first calibration training signal during a first calibration period;
the receiver being further configured to receive, via the receive antenna, a second calibration training signal transmitted by the remote apparatus during a second calibration period; and
the processing circuitry being further configured to generate a propagation delay value estimate relating to the wireless channel between the local and remote apparatus in accordance with the second calibration training signal, a propagation delay value relating to the wireless channel between the apparatus and the remote apparatus.

25. The apparatus of claim 20, wherein the plurality of orthogonal training signals comprises zero correlation zone (ZCZ) sequences.

26. The apparatus of claim 20, wherein the plurality of orthogonal training signals comprises a base Zadoff-Chu sequence and cyclic shifts thereof.

27. The apparatus of claim 20, wherein the plurality of orthogonal training signals comprises Zadoff-Chu sequences modulated with blocks of random phase rotations.

* * * * *